(12) United States Patent
Eason

(10) Patent No.: US 8,106,278 B2
(45) Date of Patent: Jan. 31, 2012

(54) PERCUSSION INSTRUMENT SUPPORT APPARATUS

(75) Inventor: Donald H. Eason, Fort Collins, CO (US)

(73) Assignee: Swift Distribution Inc., Torrance, CA (US)

( * ) Notice: Subject to any disclaimer, the term of this patent is extended or adjusted under 35 U.S.C. 154(b) by 0 days.

(21) Appl. No.: 12/597,905

(22) PCT Filed: Apr. 28, 2008

(86) PCT No.: PCT/US2008/061807
§ 371 (c)(1),
(2), (4) Date: Oct. 27, 2009

(87) PCT Pub. No.: WO2008/134653
PCT Pub. Date: Nov. 6, 2008

(65) Prior Publication Data
US 2010/0116121 A1   May 13, 2010

Related U.S. Application Data

(60) Provisional application No. 60/926,448, filed on Apr. 27, 2007.

(51) Int. Cl.
*G10D 13/02* (2006.01)
(52) U.S. Cl. .......................................... 84/421; 403/90
(58) Field of Classification Search .................. 84/421; 403/90
See application file for complete search history.

(56) References Cited

U.S. PATENT DOCUMENTS

| | | | |
|---|---|---|---|
| 169,383 A * | 11/1875 | Starr ................................ 403/90 |
| 259,957 A * | 6/1882 | White .............................. 403/90 |
| 438,238 A * | 10/1890 | Jefferies et al. ............... 403/131 |
| 566,361 A * | 8/1896 | White ............................ 403/131 |
| 958,052 A * | 5/1910 | Williams ......................... 248/60 |
| 1,574,899 A * | 3/1926 | Kellogg ...................... 248/276.1 |
| 1,672,605 A * | 6/1928 | Dobrick .......................... 248/56 |
| 2,196,338 A * | 4/1940 | McDaniel .................. 280/405.1 |
| 2,433,594 A | 12/1947 | Calo |
| 2,652,221 A * | 9/1953 | Kampa ...................... 248/276.1 |
| 2,754,616 A * | 7/1956 | Law .............................. 43/44.91 |
| 2,767,003 A * | 10/1956 | Gilmont ........................ 403/385 |
| 3,191,484 A * | 6/1965 | Walling .......................... 84/421 |
| 3,405,587 A * | 10/1968 | Meazzi et al. ................. 84/421 |
| 3,535,976 A | 10/1970 | Osuga |
| 3,576,149 A | 4/1971 | Slingerland, Jr. |
| 3,704,645 A * | 12/1972 | Grauso et al. .................. 84/421 |
| 3,843,083 A * | 10/1974 | Angibaud ................ 248/229.14 |
| 3,989,321 A | 11/1976 | McCloskey |
| 4,141,272 A | 2/1979 | Yanagisawa |

(Continued)

OTHER PUBLICATIONS

International Application No. PT/US2008/061807; International Search Report dated Aug. 4, 2008.

(Continued)

*Primary Examiner* — Elvin G Enad
*Assistant Examiner* — Robert W Horn
(74) *Attorney, Agent, or Firm* — Santangelo Law Offices, P.C.

(57) ABSTRACT

The inventive technology, in embodiments, relates variously to item support apparatus that offer one or more of a variety of operational benefits, including but not limited to independently operable force enhancers whereby various retention forces may be enhanced independently of one another, and side-assembly. The inventive technology presents, generally, two different types of apparatus—one featuring a ball having a passage through which an item support rack member (e.g., a drum rack member) may be slidingly passed, and a second featuring a ball without a passageway therethrough.

31 Claims, 25 Drawing Sheets

U.S. PATENT DOCUMENTS

| | | | |
|---|---|---|---|
| 4,158,981 A | | 6/1979 | Kurosaki |
| 4,307,864 A | * | 12/1981 | Benoit ............... 248/222.11 |
| 4,357,651 A | * | 11/1982 | Mayer .................. 362/275 |
| 4,453,446 A | | 6/1984 | Hoshino |
| 4,796,508 A | | 1/1989 | Hoshino |
| 4,946,122 A | * | 8/1990 | Ramsey et al. ........... 248/229.2 |
| 4,958,793 A | * | 9/1990 | Hess ................... 248/125.9 |
| 4,971,271 A | | 11/1990 | Sularz |
| 5,109,321 A | * | 4/1992 | Maglica et al. ............ 362/191 |
| 5,112,071 A | * | 5/1992 | Jones ................... 280/152.3 |
| 5,393,161 A | * | 2/1995 | Mata et al. .............. 403/133 |
| 5,498,098 A | * | 3/1996 | Cairns ................... 403/400 |
| 5,501,544 A | * | 3/1996 | Cairns ................... 403/400 |
| 5,645,253 A | | 7/1997 | Hoshino |
| 5,667,185 A | * | 9/1997 | Maglica ................. 248/541 |
| 5,803,642 A | * | 9/1998 | Sassmannshausen ......... 403/90 |
| 5,804,747 A | | 9/1998 | Chen |
| 5,860,728 A | | 1/1999 | Maglica |
| 5,881,667 A | * | 3/1999 | Herbert .................. 116/209 |
| 5,895,874 A | | 4/1999 | Liao |
| 5,949,009 A | | 9/1999 | Chen |
| 5,973,248 A | * | 10/1999 | Chen .................... 84/421 |
| 6,054,645 A | | 4/2000 | Gauger |
| 6,070,835 A | * | 6/2000 | Stillinger ................ 248/56 |
| 6,075,190 A | | 6/2000 | Mosser et al. |
| 6,093,878 A | | 7/2000 | Hoshino |
| 6,096,956 A | * | 8/2000 | Hoshino .................. 84/421 |
| 6,189,229 B1 | * | 2/2001 | Thomas et al. ............ 34/90 |
| 6,264,396 B1 | | 7/2001 | Dobrovolny |
| 6,346,665 B1 | | 2/2002 | Liao |
| 6,386,786 B1 | * | 5/2002 | Perlman et al. ............ 403/90 |
| 6,394,408 B1 | * | 5/2002 | Henderson et al. .......... 248/640 |
| 6,513,774 B2 | | 2/2003 | Hailson |
| 6,520,465 B1 | * | 2/2003 | Sack et al. .............. 248/227.4 |
| 6,610,916 B1 | * | 8/2003 | Torrez .................. 84/421 |
| 6,653,540 B2 | * | 11/2003 | Izen et al. .............. 84/421 |
| 6,676,570 B2 | * | 1/2004 | Valentino ............... 482/45 |
| 6,830,225 B2 | * | 12/2004 | Kato .................... 248/49 |
| 7,007,901 B2 | * | 3/2006 | Kondo ................... 248/75 |
| 7,055,910 B2 | | 6/2006 | Wright |
| 7,191,988 B2 | * | 3/2007 | Kim et al. ............... 248/68.1 |
| 7,384,078 B2 | * | 6/2008 | Cobb et al. .............. 285/420 |
| D576,870 S | * | 9/2008 | Eason et al. ............. D8/396 |
| D580,262 S | * | 11/2008 | Eason et al. ............. D8/396 |
| 7,534,965 B1 | * | 5/2009 | Thompson ............... 174/153 G |
| 7,637,686 B2 | * | 12/2009 | Wood et al. ............. 403/302 |
| D613,092 S | * | 4/2010 | Eason et al. ............. D6/462 |
| 7,805,881 B2 | * | 10/2010 | Kavanaugh .............. 43/44.91 |
| 2001/0020668 A1 | * | 9/2001 | Thomas et al. ........... 248/309.3 |
| 2002/0169460 A1 | * | 11/2002 | Foster et al. ............. 606/130 |
| 2004/0245416 A1 | * | 12/2004 | Attee ................... 248/214 |
| 2006/0198628 A1 | | 9/2006 | Knightlinger |
| 2009/0215545 A1 | * | 8/2009 | King et al. .............. 472/136 |
| 2010/0042111 A1 | * | 2/2010 | Qureshi et al. ........... 606/130 |
| 2010/0116121 A1 | * | 5/2010 | Eason ................... 84/421 |
| 2010/0313735 A1 | * | 12/2010 | Steinhauser et al. ........ 84/421 |

OTHER PUBLICATIONS

International Application No. PT/US2008/061807; Written Opinion of the International Searching Authority dated Aug. 4, 2008.

International Application No. PT/US2008/061807; International Preliminary Report on Patentability dated Mar. 21, 2011.

Parallel European Application No. 08747048.0; extended European search report dated Aug. 19, 2011.

* cited by examiner

US 8,106,278 B2

PERCUSSION INSTRUMENT SUPPORT APPARATUS

I. CROSS-REFERENCE TO RELATED APPLICATIONS

This is a United States National Phase application that claims priority to and the benefit of PCT application PCT/US2008/061807, filed Apr. 28, 2008, published on Nov. 6, 2008 as WO2008/134653, said PCT application claiming priority to and benefit of U.S. Provisional Application No. 60/926,448, filed Apr. 27, 2007, all said applications incorporated herein by reference.

II. BACKGROUND OF THE INVENTION

Generally, this inventive technology relates to an item support apparatus and techniques for supporting items in a desired spatial orientation. More specifically, embodiments of the inventive technology relate to percussion instrument support apparatus that find use in retaining a percussion instrument in fixed position relative to a drum rack.

The desire to hold items including but not limited to drums in a desired spatial orientation is well known. There are indeed many different types of apparatus designed to attach a drum to a drum rack. However, known technologies are not without their problems, such as time consuming and/or difficult setup (as may be necessitated by those apparatus that require sliding over an end of a rack member in order to position it as desired on the rack member), in addition to operational limitations, including difficult, time-consuming and limited repositioning of items as desired. At least certain embodiments of the inventive technology seek to address these problems.

III. BRIEF DESCRIPTION OF THE DRAWINGS

IV. SUMMARY OF THE INVENTIVE TECHNOLOGY

Figure 1:
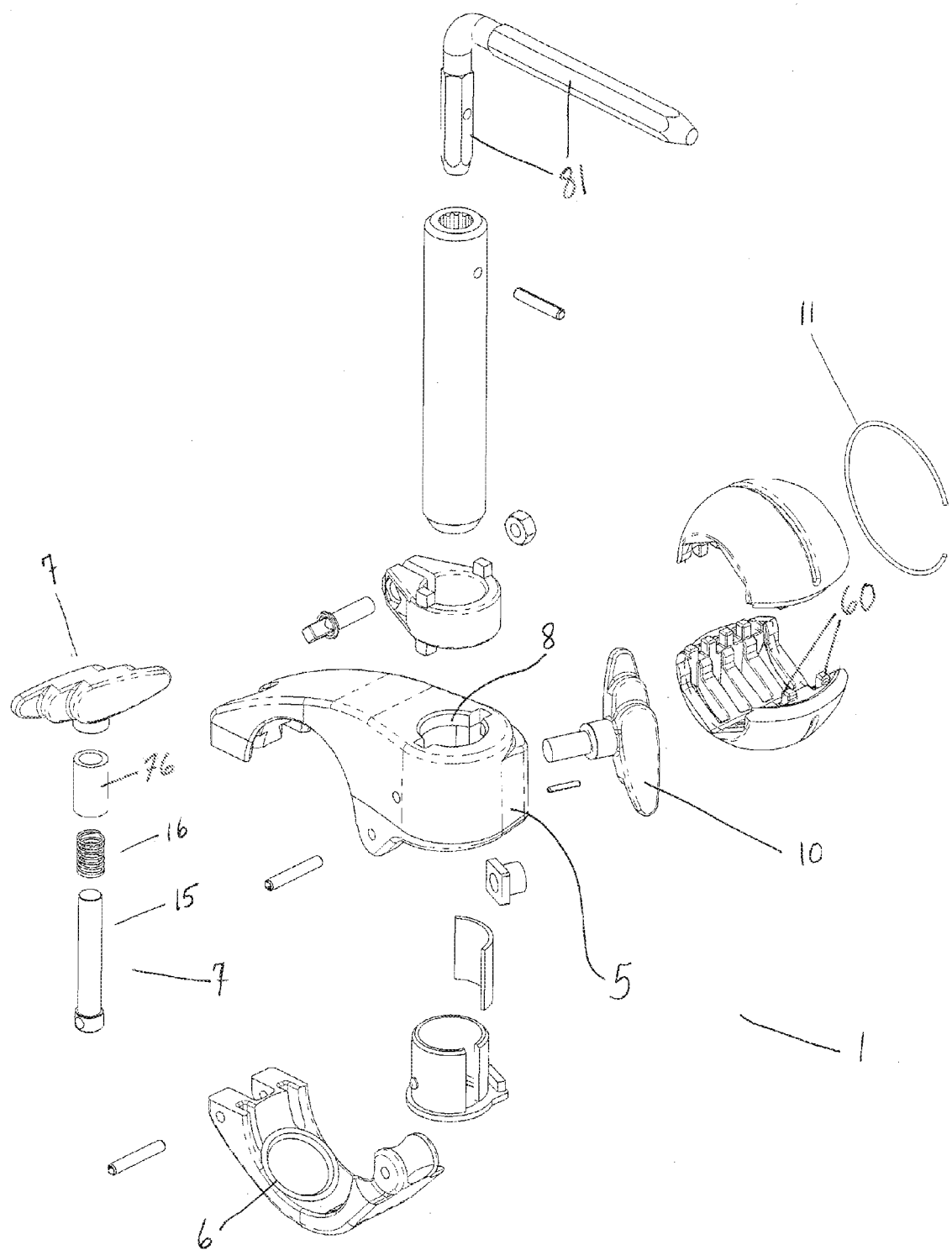
FIG. 1 shows an embodiment, in exploded view, of that aspect of the inventive technology having a ball with a passageway therethrough.
Figure 2:
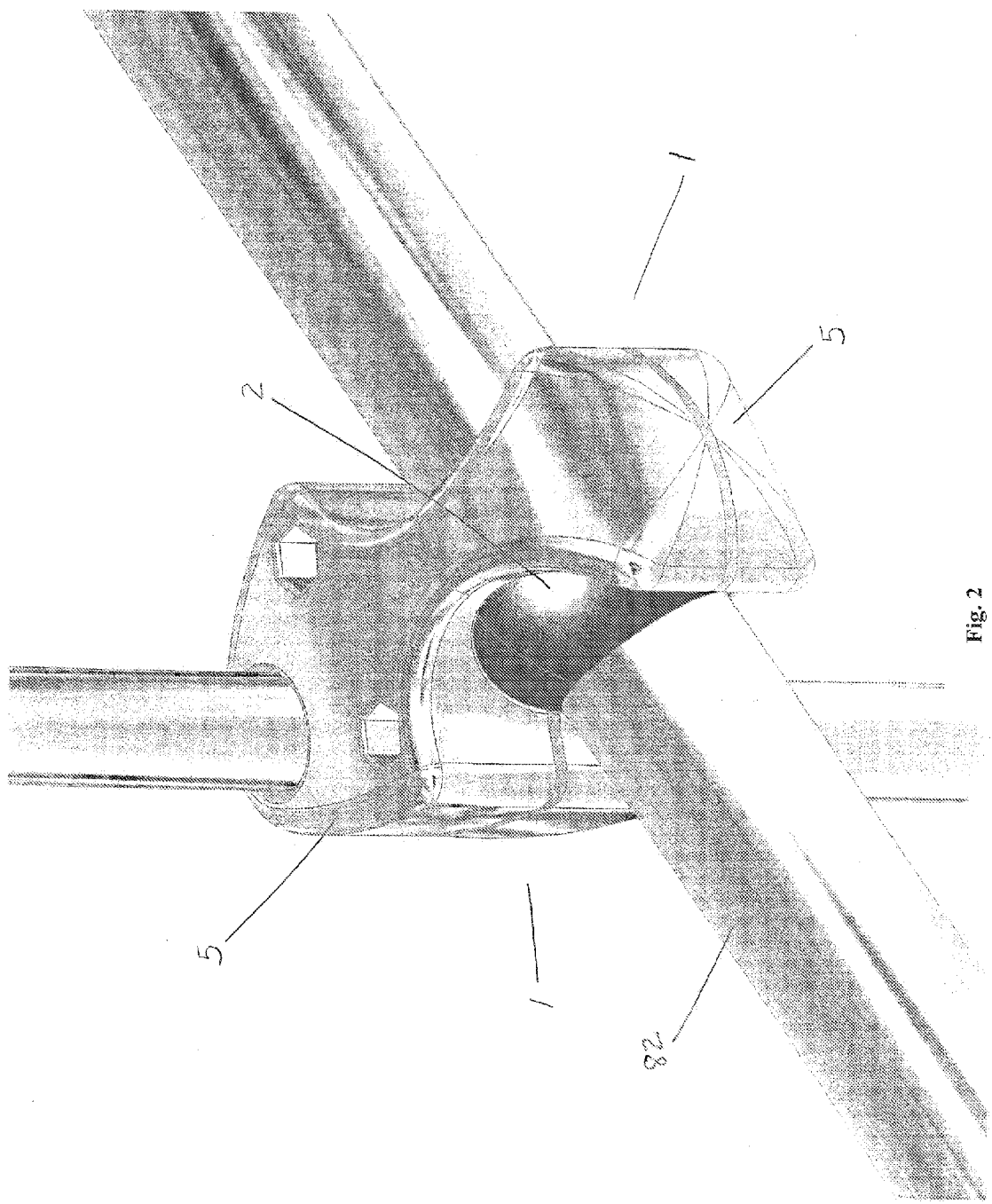
FIG. 2 shows a perspective view of an embodiment of that aspect of the inventive technology having a ball with a passageway therethrough.
Figure 3:
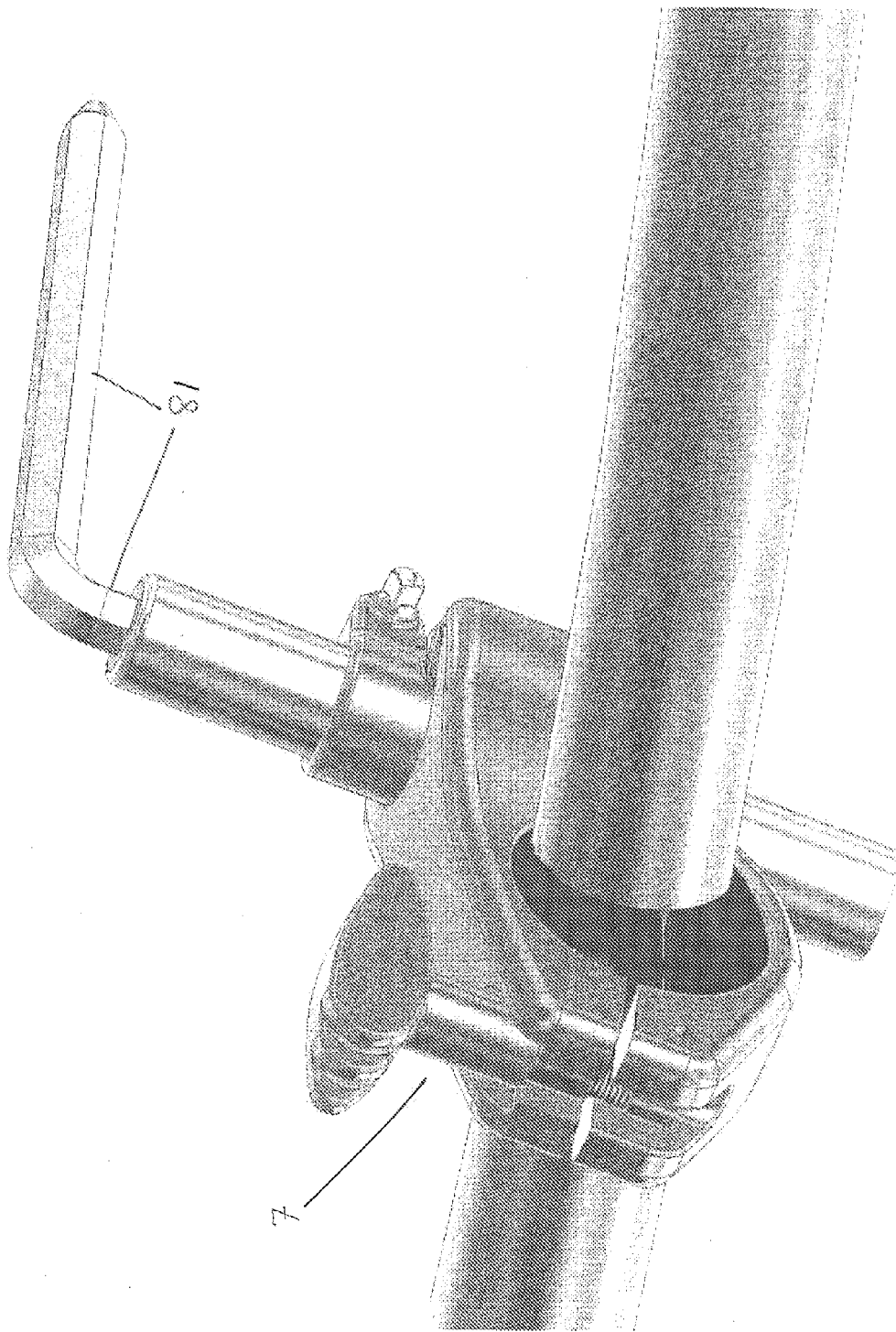
FIG. 3 shows a perspective view of an embodiment of that aspect of the inventive technology having a ball with a passageway therethrough.

The inventive technology, in embodiments, relates variously to item support apparatus that offer one or more of a variety of operational benefits, including but not limited to independently operable force enhancers whereby various retention forces may be enhanced independently of one another, and side-assembly. The inventive technology presents, generally, two different types of apparatus—one featuring a ball having a passage through which an item support rack member (e.g., a drum rack member) may be slidingly passed, and a second featuring a ball without a passageway therethrough.

As mentioned, known technologies are replete with operational problems and difficulties, including but not limited to time consuming and/or difficult setup (as may be necessitated by those apparatus that require sliding over an end of a rack member in order to position it as desired on the rack member), in addition to operational limitations, including difficult, time-consuming and limited repositioning of items as desired. At least certain embodiments of the inventive technology seek to address these problems.

IV. DETAILED DESCRIPTION OF THE PREFERRED EMBODIMENTS

As mentioned earlier, the present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

At least one embodiment of the inventive technology (embodiments that may loosely be referred to as "pierced ball" embodiments) may be an adjustable support apparatus 1 that comprises a ball 2 (e.g., a universal ball) having a passage 4 therethrough, where, when the apparatus is in a rack member release configuration, the ball may be slidably moved, through space, along a longitudinal axis of an item support rack member 82 established through the passage. The apparatus may include a housing 5 that itself includes ball compression surfaces 6 adapted to apply a ball retention force to the ball; and item support arm compression surfaces 8 adapted to apply an item support arm retention force to an item support arm 81 (either directly or indirectly). The adjustable support apparatus may further comprise a ball retention force enhancer 7 adapted to enhance the ball retention force (and, in pierced ball embodiments, thereby enhance the force of the ball on the item support rack member that may be established through it), perhaps without enhancing the item support arm retention force (as such, the ball retention force enhancer may be termed independently operating); and an item support arm retention force enhancer 10 adapted to enhance the item support arm retention force, perhaps without enhancing the ball retention force (as such, the item support arm retention force enhancer may be termed independently operating). Generally, FIGS. 1-13, 24 and 25 show "pierced ball" embodiments.

In particular "pierced ball" embodiments, the housing may be movable through space during axial motion of the ball relative to the item support rack member when the apparatus is simultaneously in a rack member release configuration and an item support arm lock configuration. Instead, or in addition, when the apparatus is simultaneously in a rack member lock configuration, and an item support arm release configuration, the item support arm may be movable relative to the housing.

Figure 4:
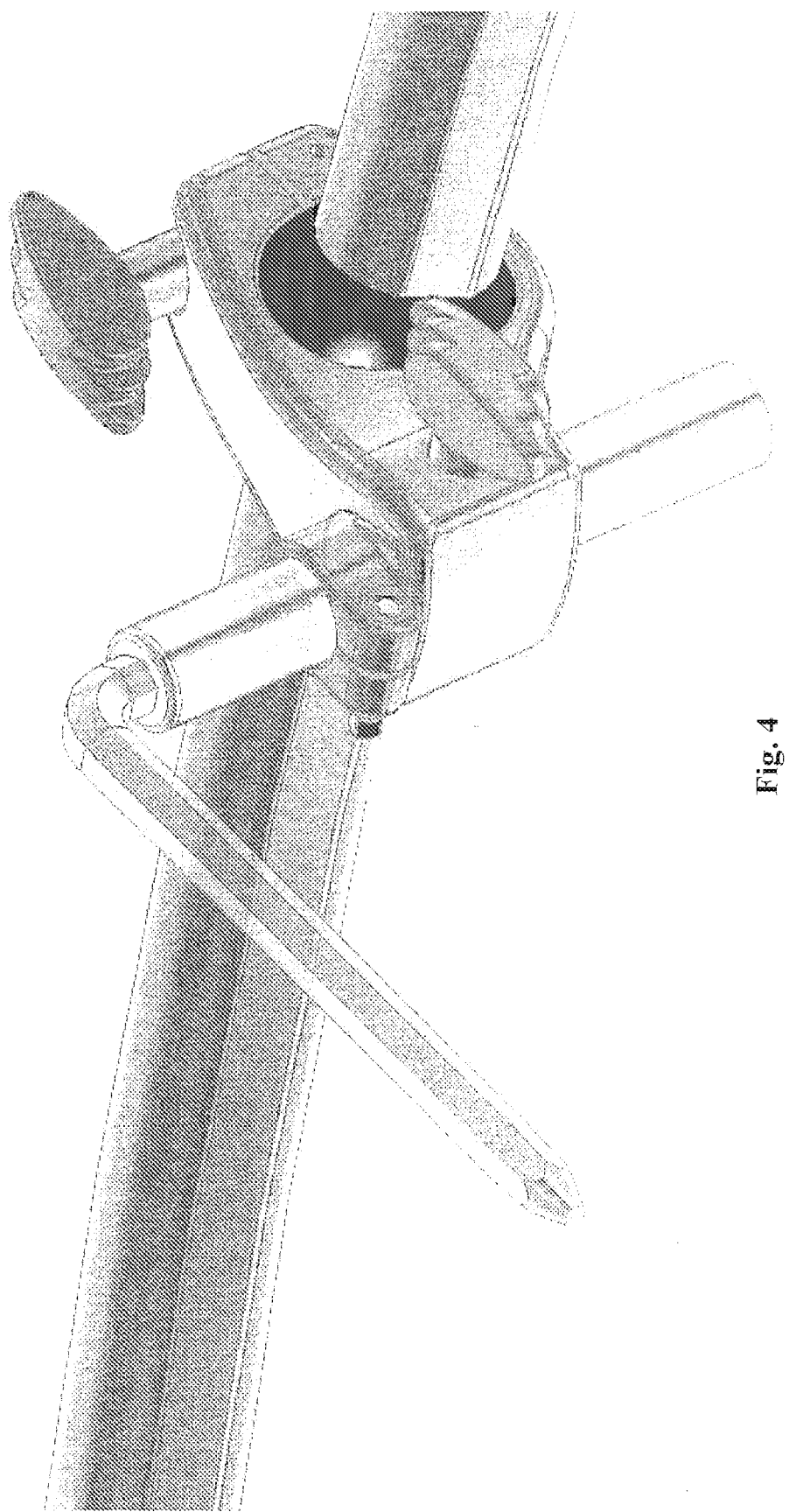
FIG. 4 shows a perspective view of an embodiment of that aspect of the inventive technology having a ball with a passageway therethrough.
Figure 5:
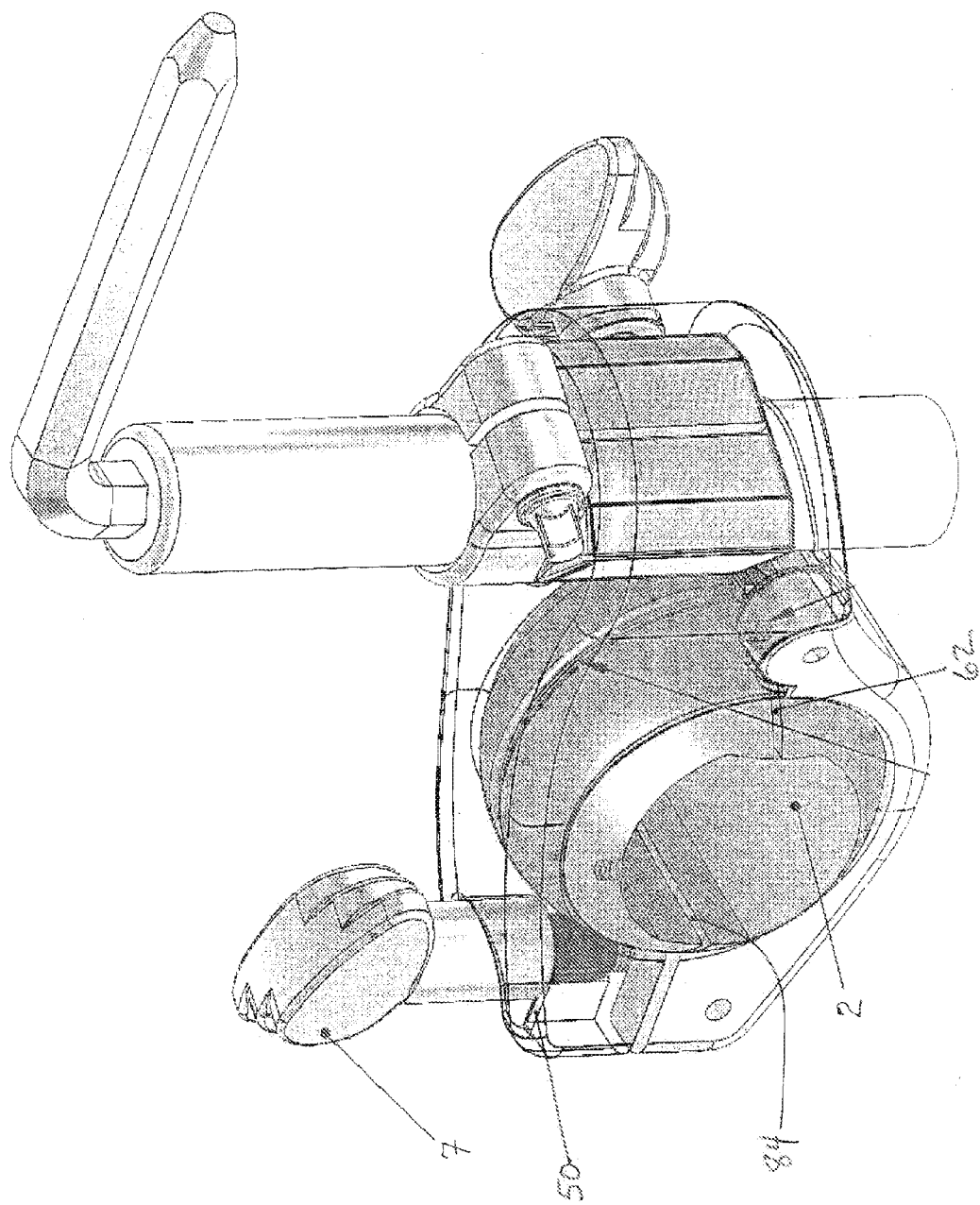
FIG. 5 shows a perspective view, in outline form, of an embodiment of that aspect of the inventive technology having a ball with a passageway therethrough.
Figure 6:
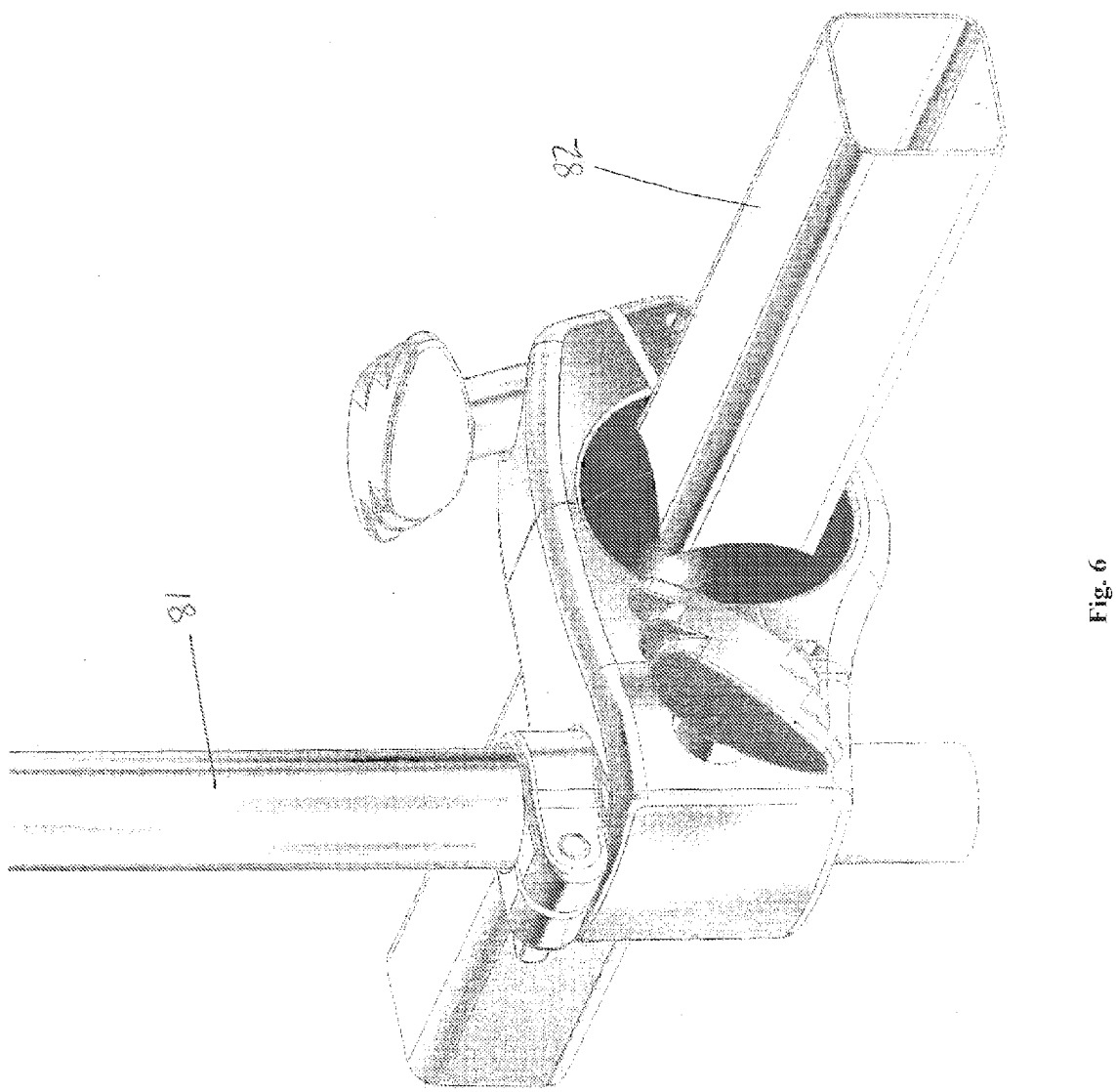
FIG. 6 shows a perspective view of an embodiment of that aspect of the inventive technology having a ball with a passageway therethrough.
Figure 7:
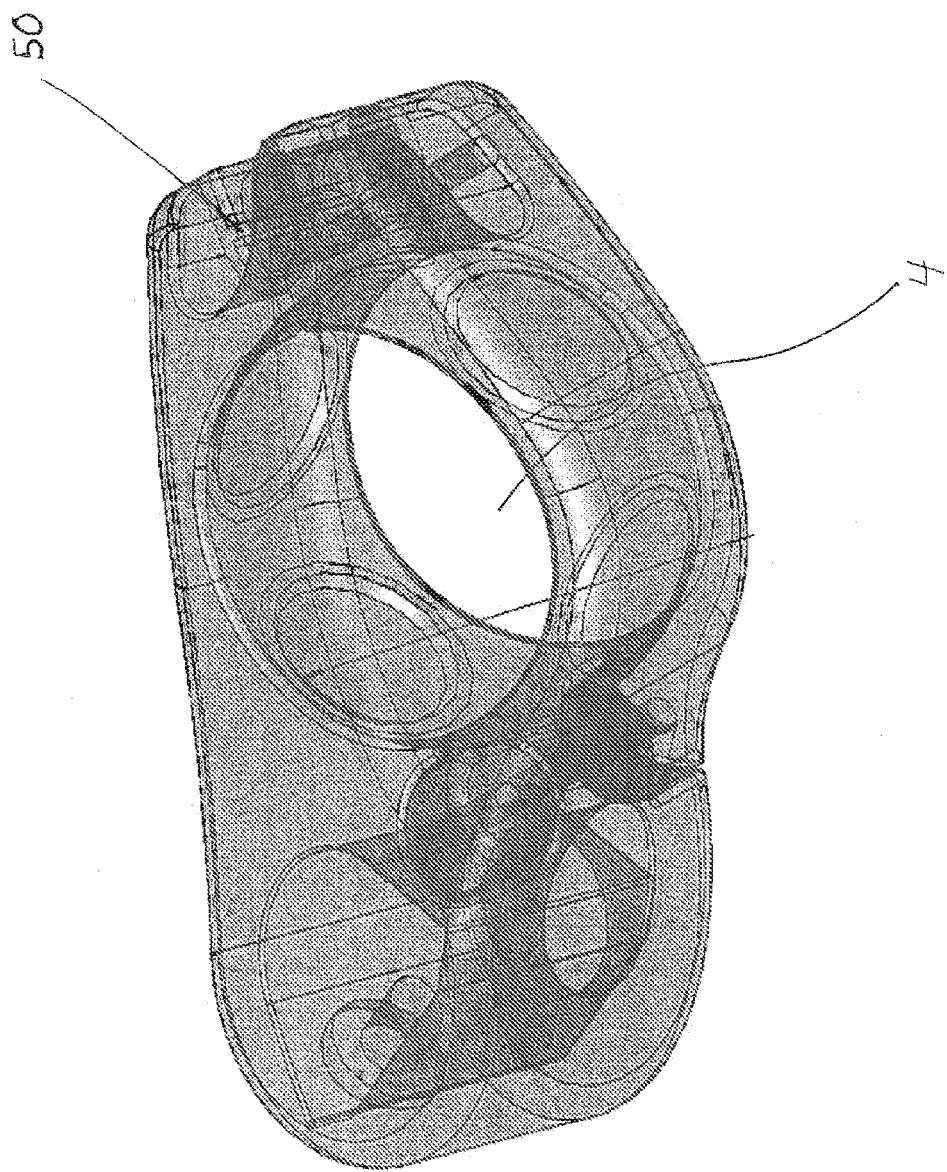
FIG. 7 shows a perspective view of an embodiment of that aspect of the inventive technology usable on a ball with a passageway therethrough.
Figure 8:
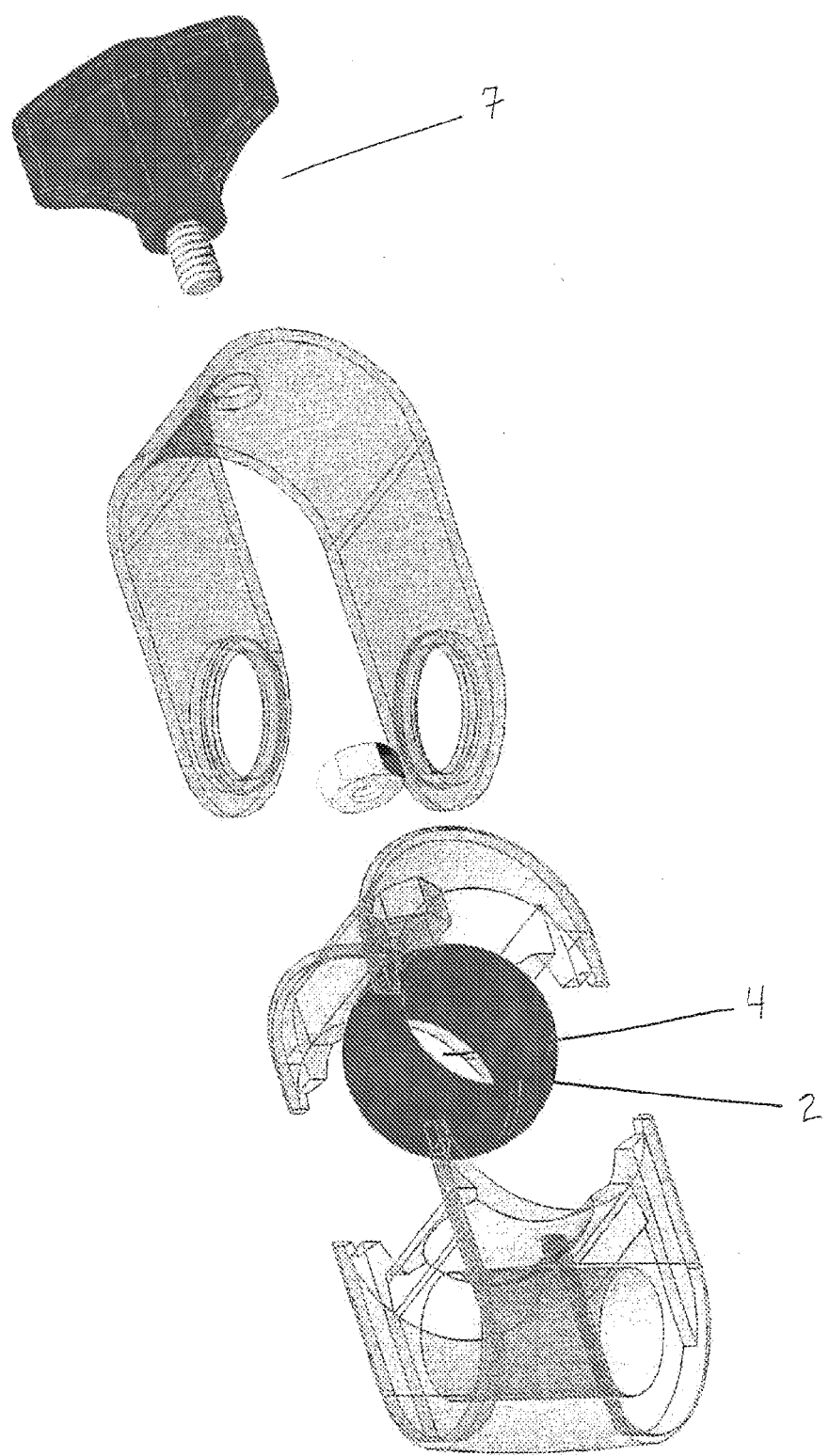
FIG. 8 shows an embodiment, in exploded view, of that aspect of the inventive technology having a ball with a passageway therethrough.
Figure 9:
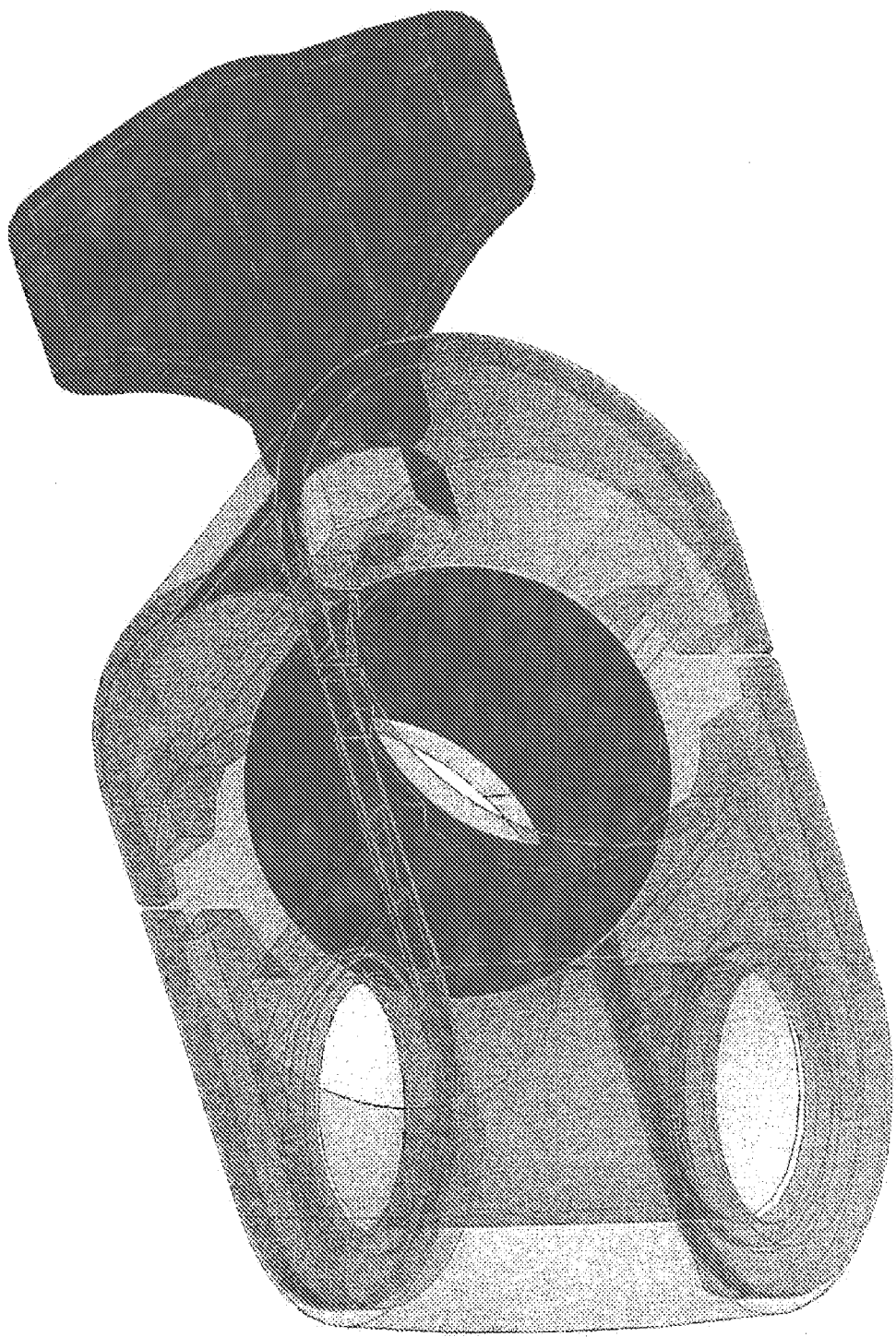
FIG. 9 shows a perspective view of an embodiment of that aspect of the inventive technology having a ball with a passageway therethrough.
Figure 10A:
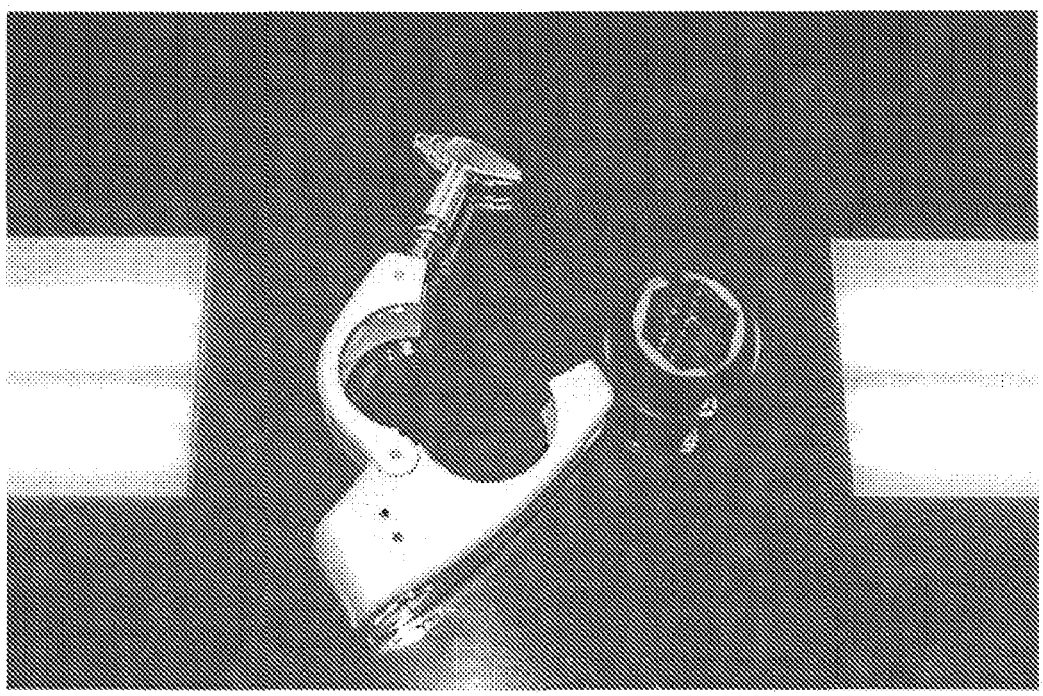
FIG. 10 shows photographs of two views of an embodiment of that aspect of the inventive technology having a ball with a passageway therethrough.
Figure 10B:
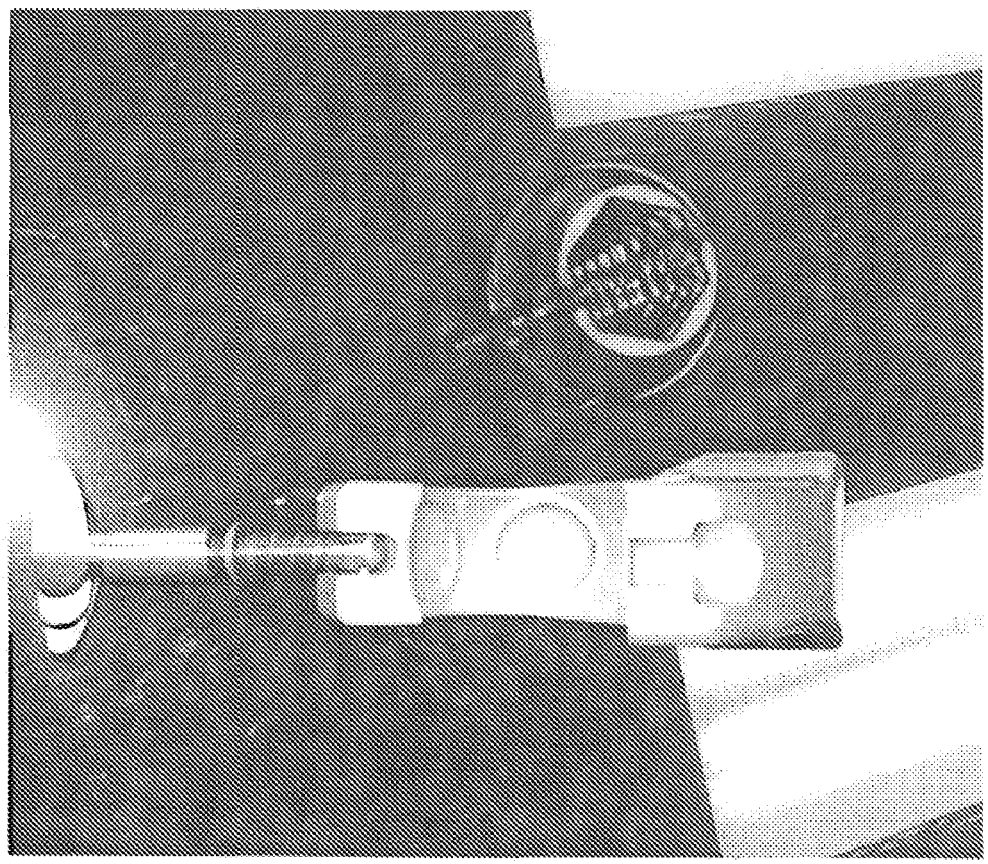
Figure 11A:
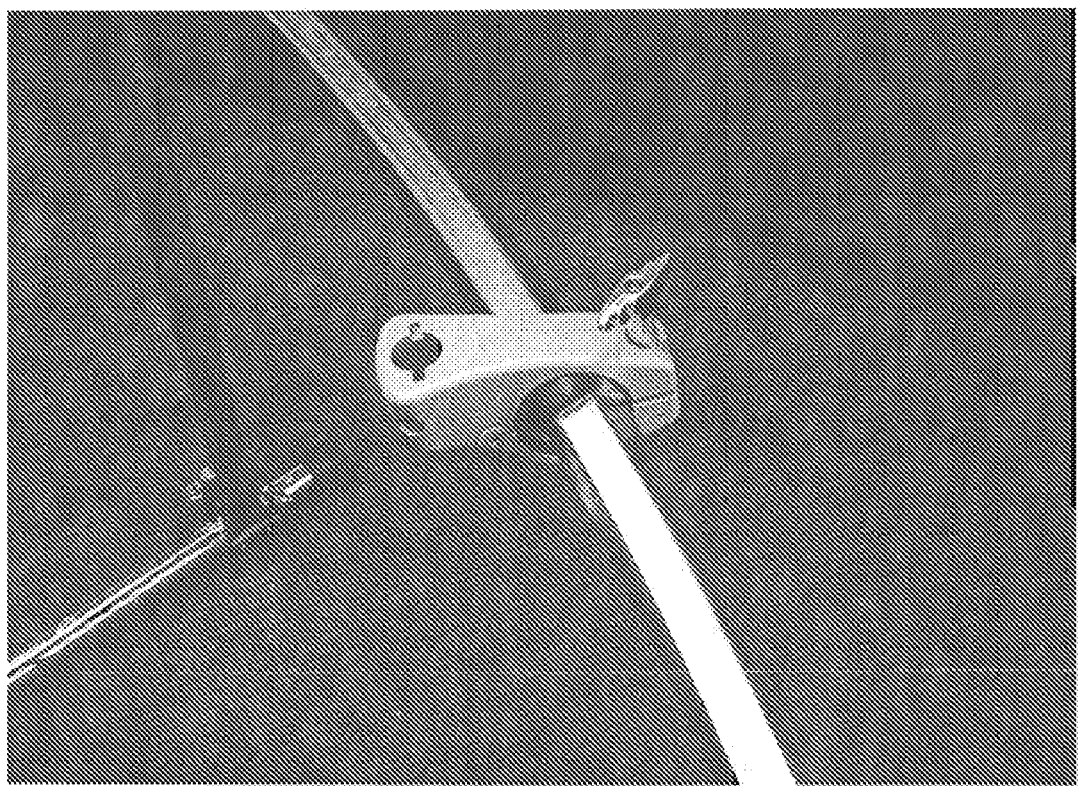
FIG. 11 shows photographs of an embodiment of that aspect of the inventive technology having a ball with a passageway therethrough as attached to a drum rack member (e.g., drum rack tier).
Figure 11B:
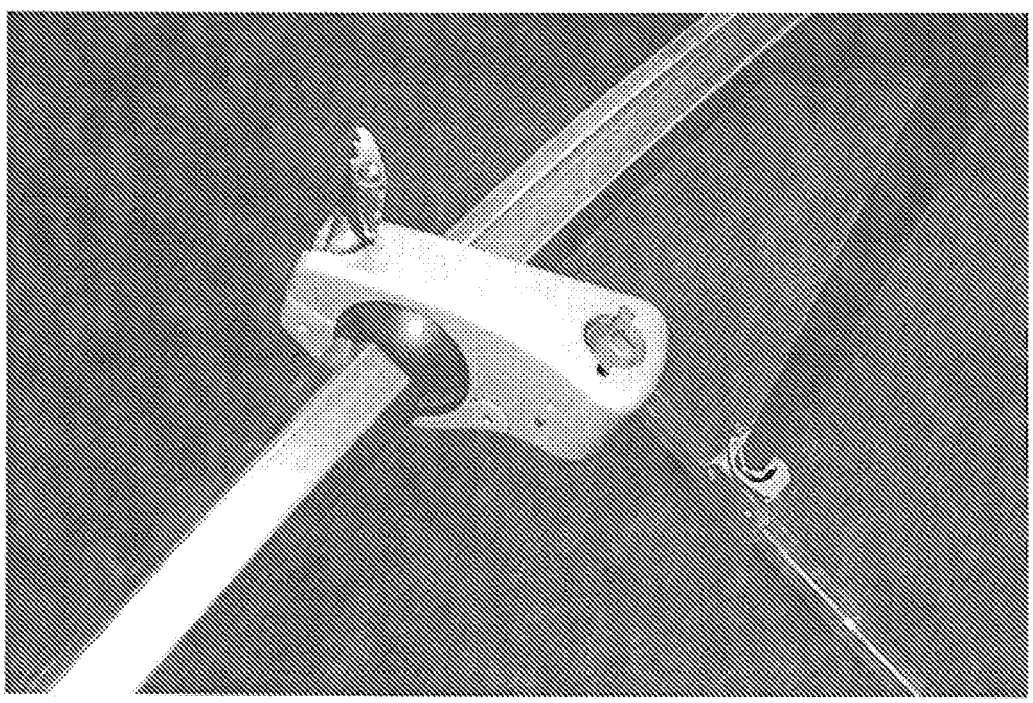
Figure 12:
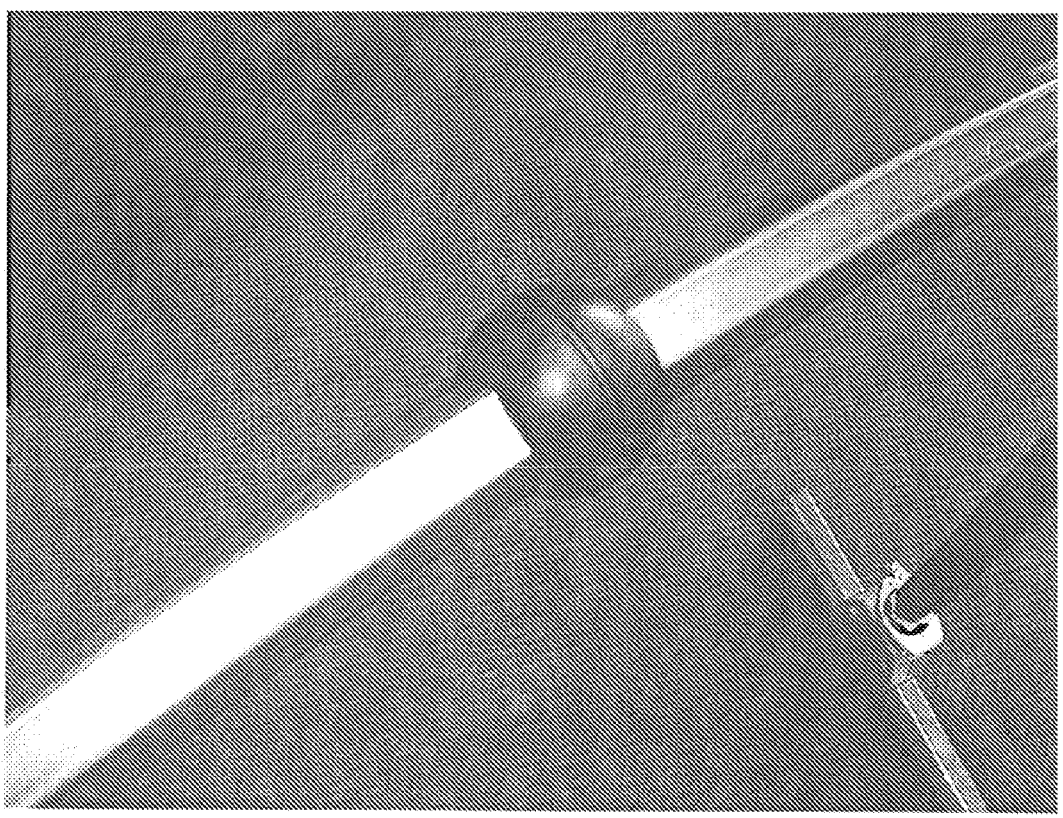
FIG. 12 shows a photograph of the ball (as established around a drum rack support member) that is incorporated as part of an aspect of the inventive technology
Figure 13:
FIG. 13 shows a drum rack with a drum rack support member having established thereon an embodiment of that aspect of the inventive technology having a ball with a passageway therethrough.

In particular "pierced ball" embodiments, the ball retention force enhancer applies the ball retention force in a direction that is orthogonal to that direction in which the item support arm retention force enhancer applies the item support arm retention force (see, e.g., FIG. 4). In certain designs, the ball is adapted to snap onto the item support rack member upon application of a threshold force (indeed, in certain embodiments, it may click). It may be openable along a ball hinge 61 so as to allow establishment of the ball onto the item support rack member without requiring it be slid over an end of the item support rack member (i.e., such that the ball is "side-assemblable") Inner surfaces of the ball may conform to outer surfaces of the item support rack member. For example, where the outer surfaces of the item support rack member are circular, so too may be the inner surfaces of the ball; when hexagonal, so too may be the ball's inner surfaces. Particularly when the inner surfaces of the ball are non-circular (e.g., hexagonal), the ball may "click" onto the item support rack member (perhaps as caused by "teeth" of the ball. In particular embodiments, the item support arm may be extendable along an item support arm longitudinal axis when the apparatus is in an item support arm release configuration. The item support arm may be rotatable about an item support arm axis when the apparatus is in the item support arm release configuration. In certain embodiments, the ball retention force enhancer is the same as the item support arm retention force enhancer (see, e.g., FIG. 9). In preferred embodiments, the two are distinct and different parts.

Certain embodiments of the "pierced ball" technology may include a bias clip 11 (e.g., a "broken" metal ring) adapted to keep the ball on the item support rack member when the housing is removed from the item support rack member. The bias clip may be established substantially around the ball. In particular "pierced ball" embodiments, the ball is separable from the rack member and the housing (perhaps due to a pivot hinge 84 on one side of the ball and a ball opening joint 62 on the other). It is of note that the housing's ball compression surfaces may be circular in shape, in at least one embodiment manifesting as four discrete circular ridges (see, e.g., FIG. 7); such ridges may, in certain embodiments, have a substantially 120 degree tooth angle. In particular "pierced ball" embodiments, the ball may include teeth 60 and corresponding recesses at a ball opening joint (e.g., that may be opposite a ball hinge). Such may aid in retention, or even locking (and perhaps a threshold "clicking"), of the ball around the item support rack member. It is also of note that in particular embodiments, the ball retention force enhancer, at least in part, may be pivotally established relative to the housing; it may include a shaft 15 and a bias element 16 established about the shaft so as to facilitate a threshold snapping of the shaft into a position from which the ball retention force can be enhanced.

In particular "pierced ball" embodiments, as mentioned, the clamp apparatus may include a ball that is movable through space by sliding along a longitudinal member around which it is established while a separate allowable motion (e.g., movement of a housing relative to an item support arm) is disallowed. Indeed, certain embodiments of the inventive technology may be used in four distinct operational modalities, including: (1) allowed motion of the apparatus relative to an item support rack member and allowed motion relative to an item support arm; (2) allowed motion of the apparatus relative to an item support rack member but disallowed motion relative to an item support arm; (3) disallowed motion of the apparatus relative to an item support rack member but allowed motion relative to an item support arm; and (4) disallowed motion of the apparatus relative to an item support rack member and disallowed motion relative to an item support arm (retention or lock configuration). Indeed, these four modalities may alternatively be expressed in terms of four apparatus configurations: item support arm release/lock configuration, and rack member release/lock configuration.

It is of note that in certain "pierced ball" embodiments, whenever the apparatus allows its motion relative to an item support rack member, the apparatus may be the to be in rack member release configuration, regardless of whether motion relative to the item support arm is allowed; similarly, whenever the apparatus allows its motion relative to an item support arm, the apparatus is in item support arm release configuration, regardless of whether motion relative to a rack member is allowed. Analogous descriptions apply to rack member lock configuration and item support arm lock configuration. It is also of note that, although in certain embodiments, rotational movement (e.g., omnirotational movement)

of the housing relative to the ball may be allowed without simultaneously allowing motion of the housing (indeed of the entire apparatus) relative to the rack member, in a preferred embodiment, when the apparatus allows rotational movement of the housing relative to the ball, the apparatus is in a rack member release configuration.

In particular aspects of the inventive technology (certain of which may be colloquially referred to as "solid ball" embodiments), an adjustable support apparatus may comprise: a ball 20, a housing established at least partially about the ball and that itself includes: ball compression surfaces 21 adapted to apply a ball retention force to the ball; and item support rack member compression surfaces 22 adapted to apply an item support rack member retention force to an item support rack member 82. The "solid ball" embodiments may further include a single retention force enhancer 24 adapted to enhance the item support rack member retention force and the ball retention force, wherein the ball is not configured for establishment directly onto the item support rack member (and as such is referred to as a "solid ball" embodiment, not a "pierced ball" apparatus). FIGS. 14-21 show "solid ball" embodiments. It is of note that certain solid balls of the such figures might appear to be pierced, as indeed it appears there is an arm 81 that enters them, but such arm cannot be moved relative to the ball (because there is not a passageway that allows passage therethrough of the arm) and, as such, the balls of FIGS. 14-20 do not meet the definition of "pierced."

In certain "solid ball" embodiments, the single retention force enhancer may be pivotally established relative to the housing. The single retention force enhancer 24 may be adapted to simultaneously enhance the item support rack member retention force and the ball retention force. Further, a portion of the item support rack member is established within the housing and has a item support rack member portion center 70, and the ball has a ball center 71, and a line between the item support rack member portion center and the ball center defines an axis 72, and wherein the single retention force enhancer applies a force in a direction 73 that is parallel the axis. It is also of note, as will be discussed further, that the adjustable support apparatus may be side-assemblable.

In "solid ball" aspects of the inventive technology (where the ball is not configured for establishment directly onto the item support rack member), a ball does in fact exist as part of the inventive apparatus, but it does not feature a passageway therethrough for establishment of the ball on a rack member (indeed, in preferred embodiments of this aspect of the inventive technology, the ball is not configured for establishment on the rack member); as such, the ball cannot be slid along the rack member when the apparatus is in rack member release configuration as one could see in a "pierced ball" embodiment (perhaps, in a "solid ball" embodiment, a part other than the ball is being so slid). The term "solid ball" means nothing more than that.

An aspect of the inventive technology may relate to features that facilitate apparatus assembly onto a rack member— more specifically, by allowing "side-assembly". Particular "pierced ball" embodiments (e.g., as shown in FIGS. 1, 3, 5 and 8) may be described as an adjustable support apparatus that comprises: a ball having a passage therethrough, wherein, when the apparatus is in a rack member release configuration, the ball may be slidably moved, through space, along a longitudinal axis of an item support rack member established through the passage; a housing that itself includes ball compression surfaces adapted to apply a ball retention force to the ball; item support arm compression surfaces adapted to apply an item support arm retention force to an item support arm; a ball retention force enhancer adapted to enhance the ball retention force without enhancing the item support arm retention force; and an item support arm retention force enhancer adapted to enhance the item support arm retention force without enhancing the ball retention force, wherein the ball is adapted to be side-assemblable onto the item support rack member. As can be readily understood, where something is side-assemblable onto a second item (e.g., an item support rack member or a ball, as but two examples), it need not be slid into a desired position from after placement over the end of the second item; instead, it can simply be assembled from the side directly at its desired final location on the second item. As can be readily appreciated, such a design saves time during assembly. In certain of such "side-assemblable" "pierced ball" embodiments (as, indeed, in other embodiments), the item support arm retention force enhancer may enhance item support arm retention force without enhancing the ball retention force, and/or the ball retention force enhancer enhances the ball retention force without enhancing the item support arm retention force. In certain embodiments, the housing may even be said to be side-assemblable onto the ball. It is noted that what might allow for side-assembly is, simply a hinge joint on one side of the side-assemblable part and, on the other, perhaps an openable joint. Also, the ball retention force enhancer may be pivotally established relative to the housing.

Not only can "pierced ball" designs be "side assemblable", but also, "solid ball" embodiments may also be "side-assemblable" in some fashion (see, e.g., FIGS. 14-21). Indeed, an adjustable support apparatus may comprise a ball 20, a housing established at least partially about the ball and that itself includes: ball compression surfaces 21 adapted to apply a ball retention force to the ball; and item support rack member compression surfaces 22 adapted to apply an item support rack member retention force to an item support rack member, and at least one retention force enhancer adapted to enhance an item support rack member retention force and an item support rack member retention force; wherein the housing is adapted to be side-assemblable onto the item support rack member and possibly onto the ball. The at least one retention force enhancer may be a single retention force enhancer, and the single retention force enhancer may be pivotally established relative to the housing.

Figure 14:
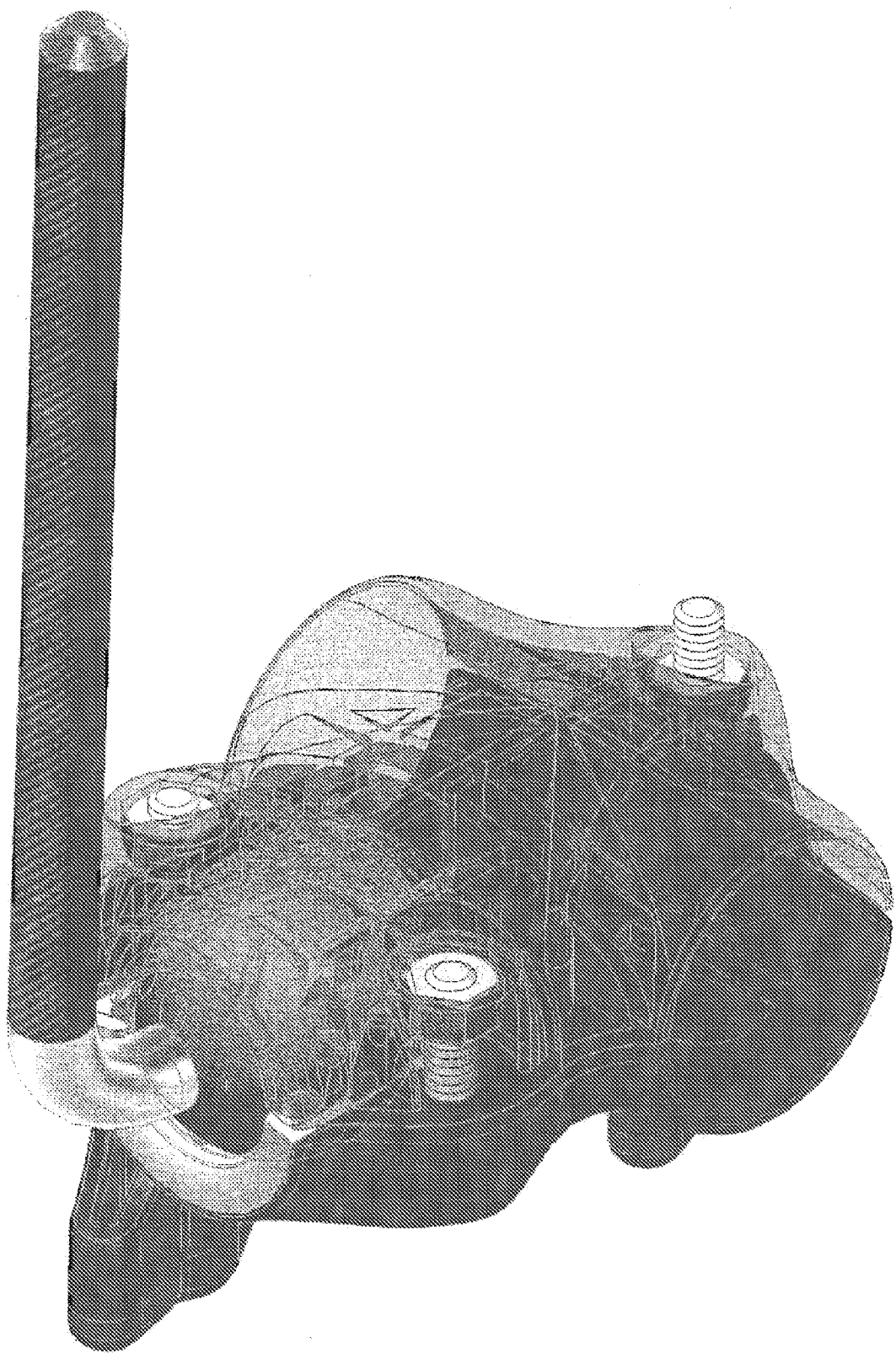
FIG. 14 shows a perspective view of an embodiment of that aspect of the inventive technology having a solid ball.
Figure 15:
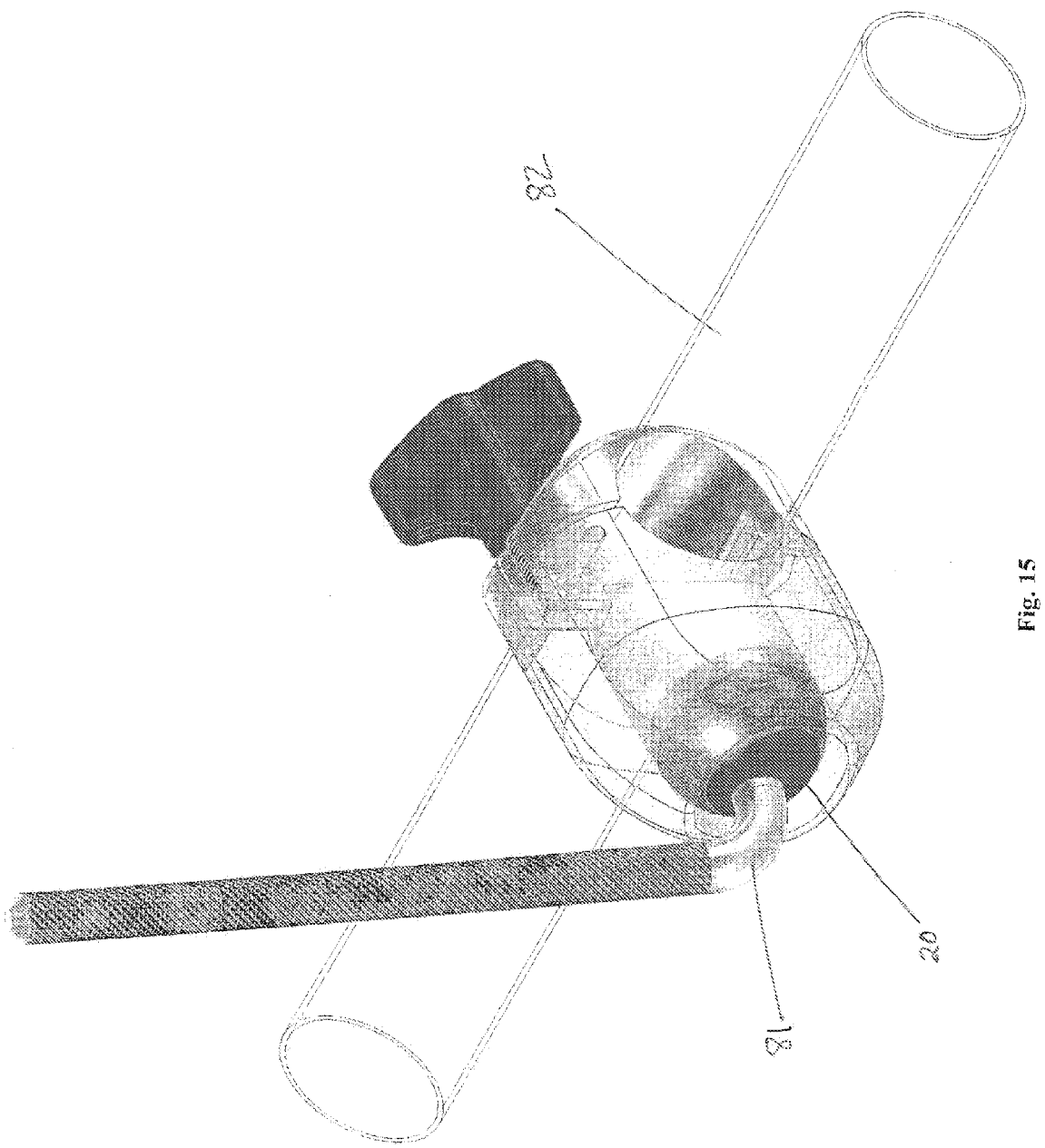
FIG. 15 shows a perspective view of an embodiment of that aspect of the inventive technology having a solid ball.
Figure 16:
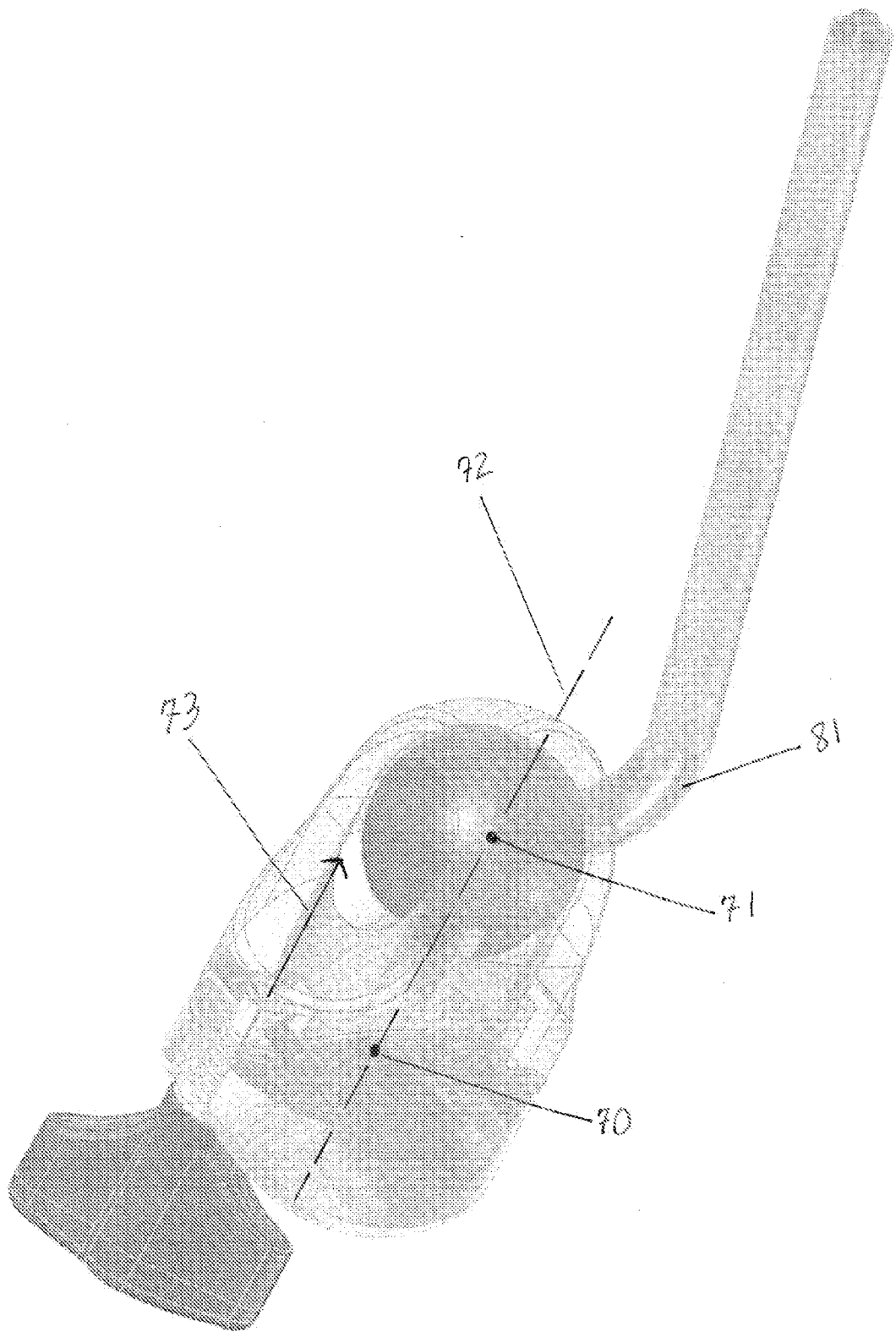
FIG. 16 shows a view of an embodiment of that aspect of the inventive technology having a solid ball.
Figure 17:
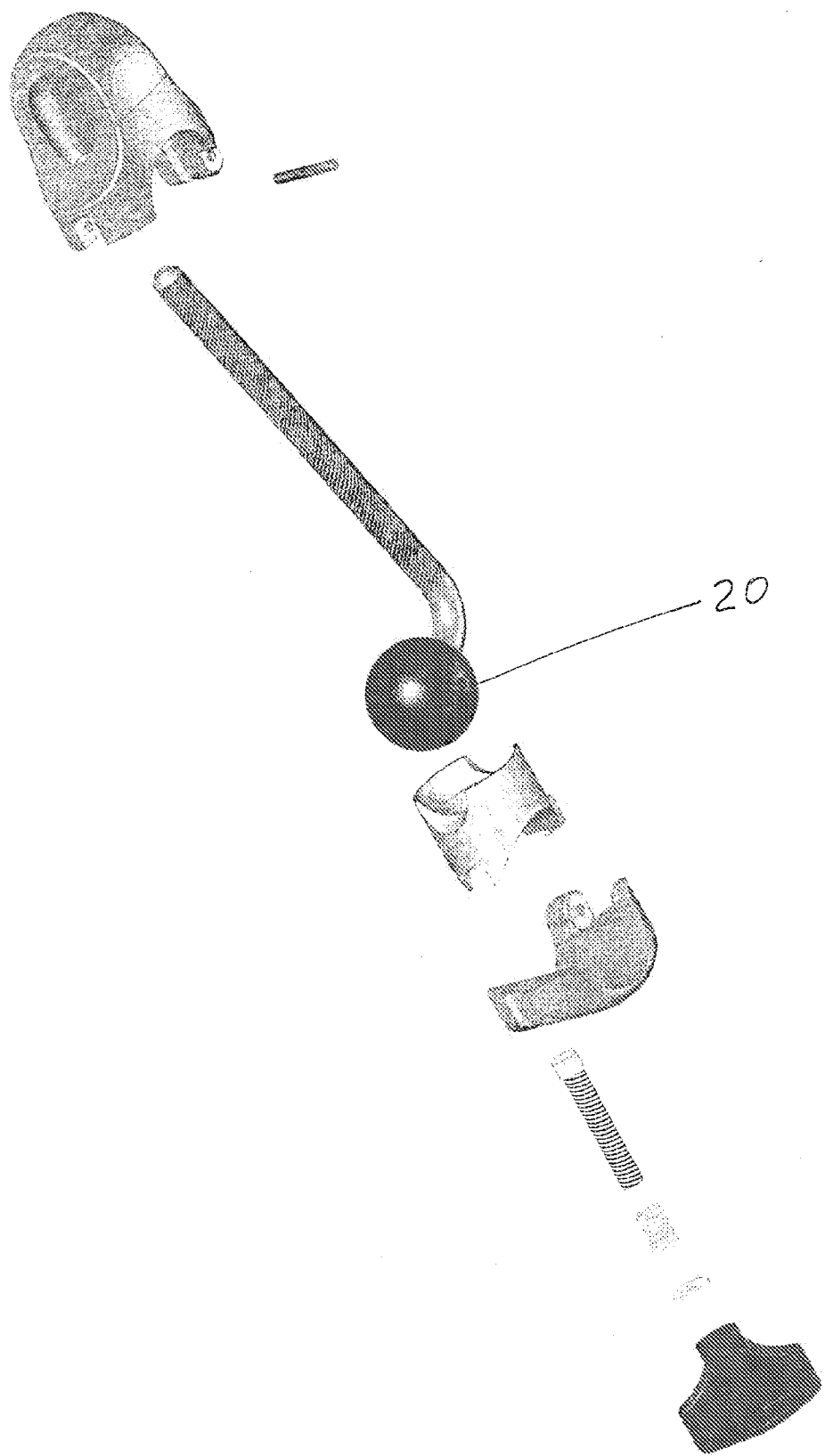
FIG. 17 shows an embodiment, in exploded view, of that aspect of the inventive technology having a solid ball.
Figure 18:
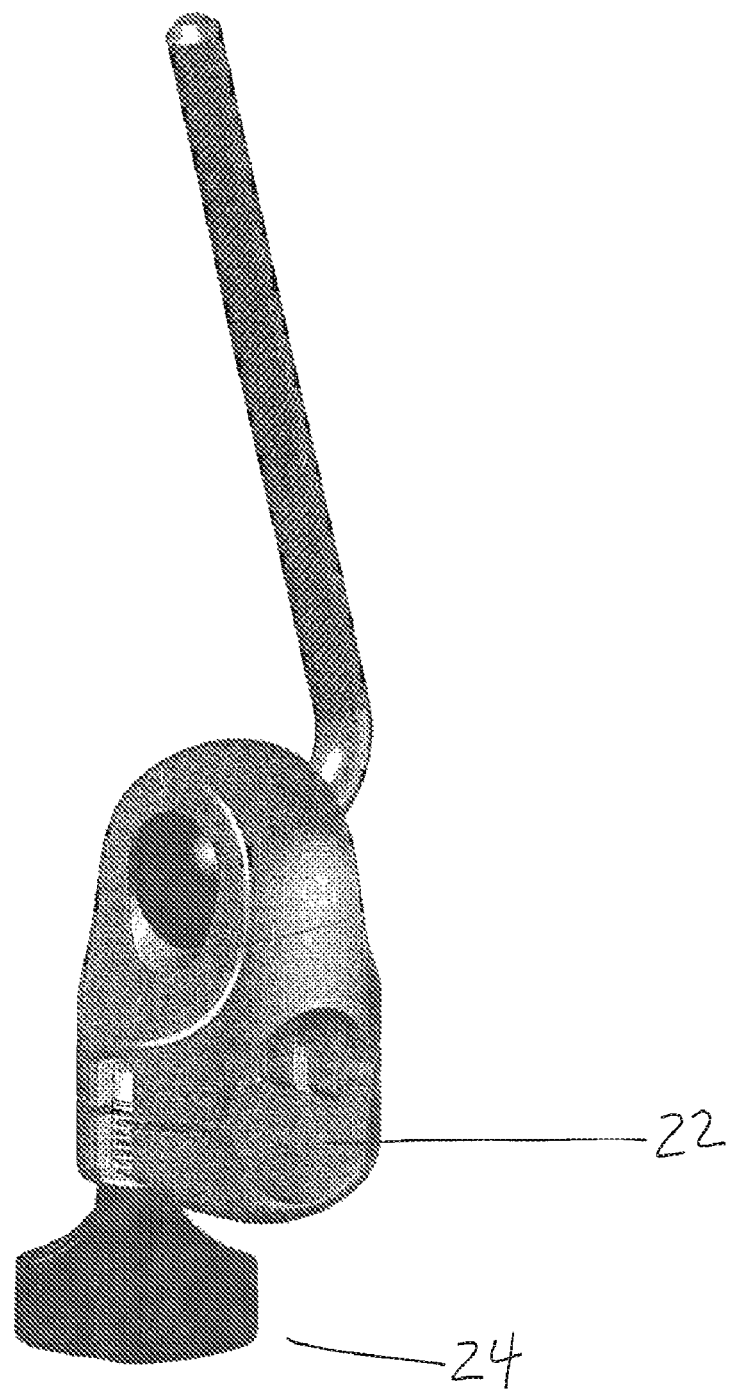
FIG. 18 shows a perspective view of an embodiment of that aspect of the inventive technology having a solid ball.
Figure 19:
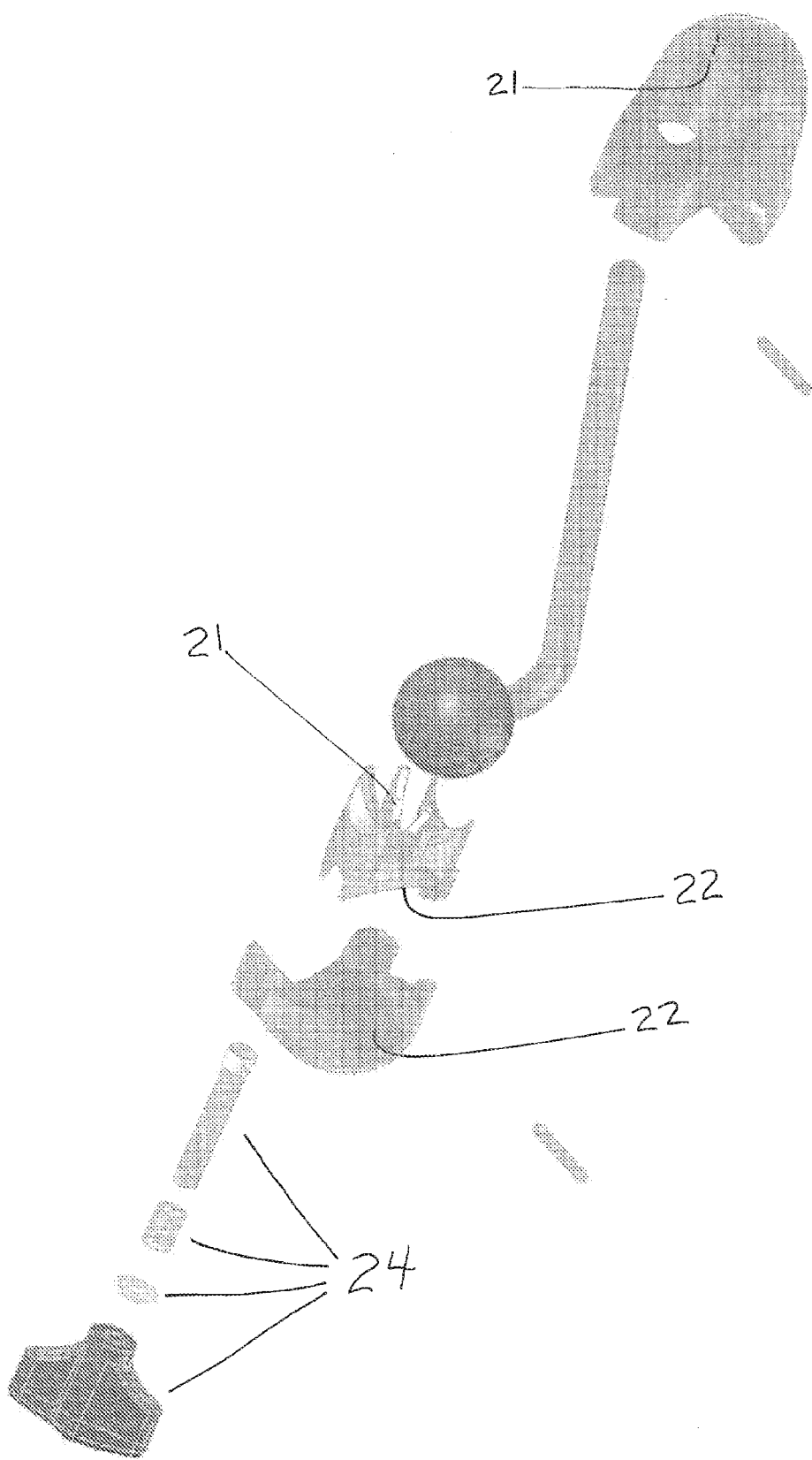
FIG. 19 shows an embodiment, in exploded view, of that aspect of the inventive technology having a solid ball.
Figure 20:
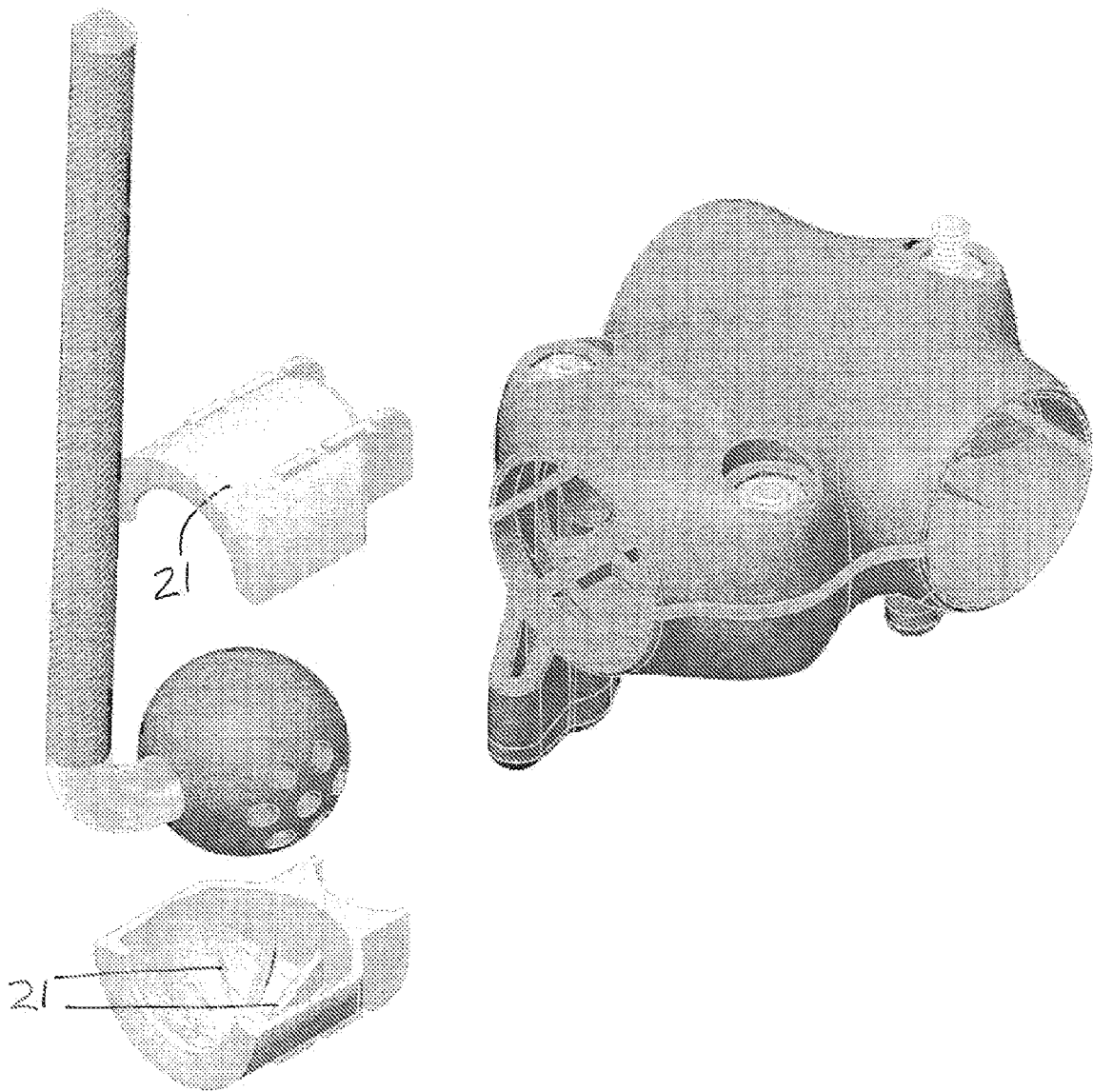
FIG. 20 shows an embodiment, in partially exploded view, of that aspect of the inventive technology having a solid ball.
Figure 21:
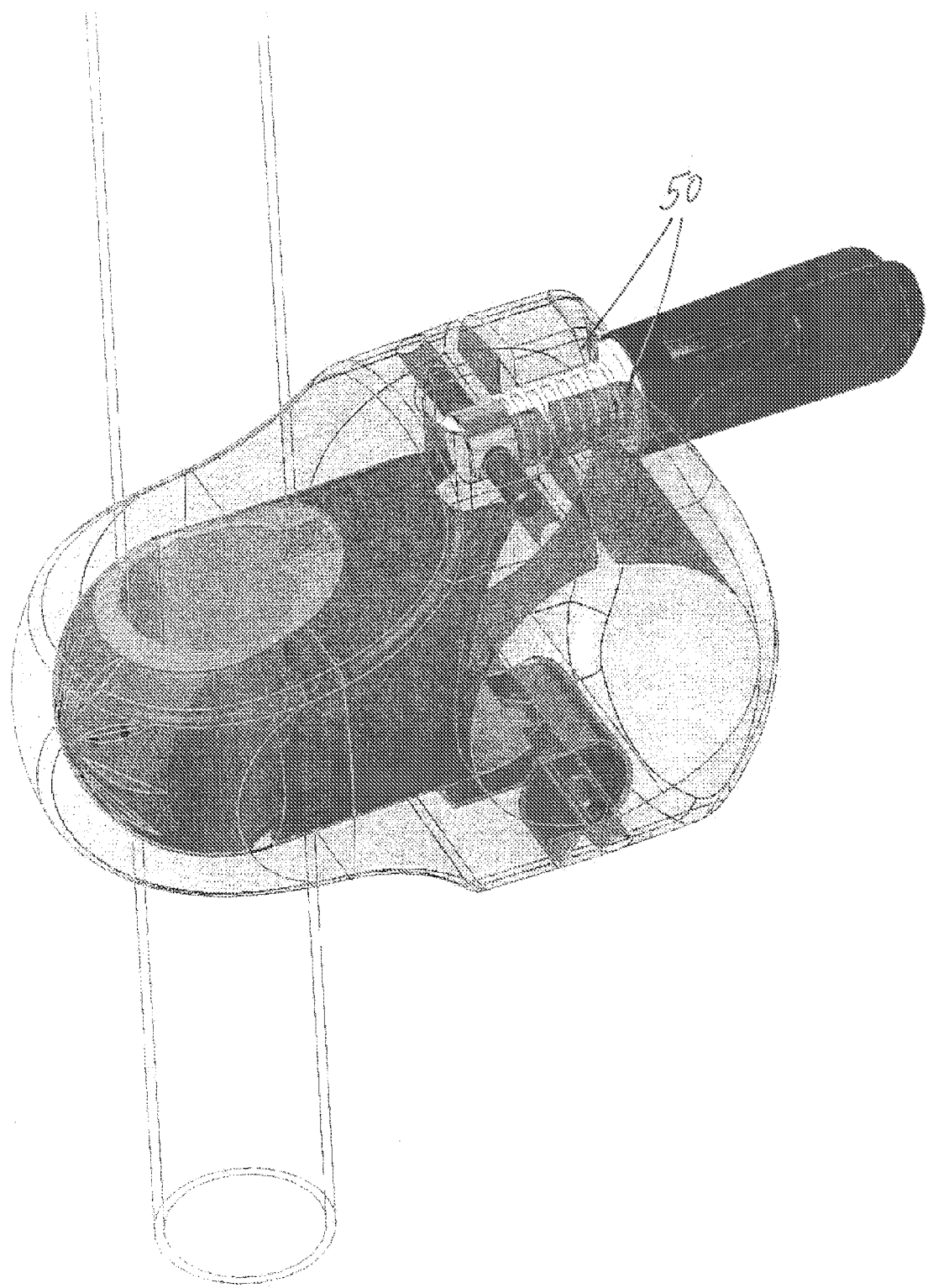
FIG. 21 shows a view of an embodiment of that aspect of the inventive technology having a cylindrical clamping adapter.
Figure 22:
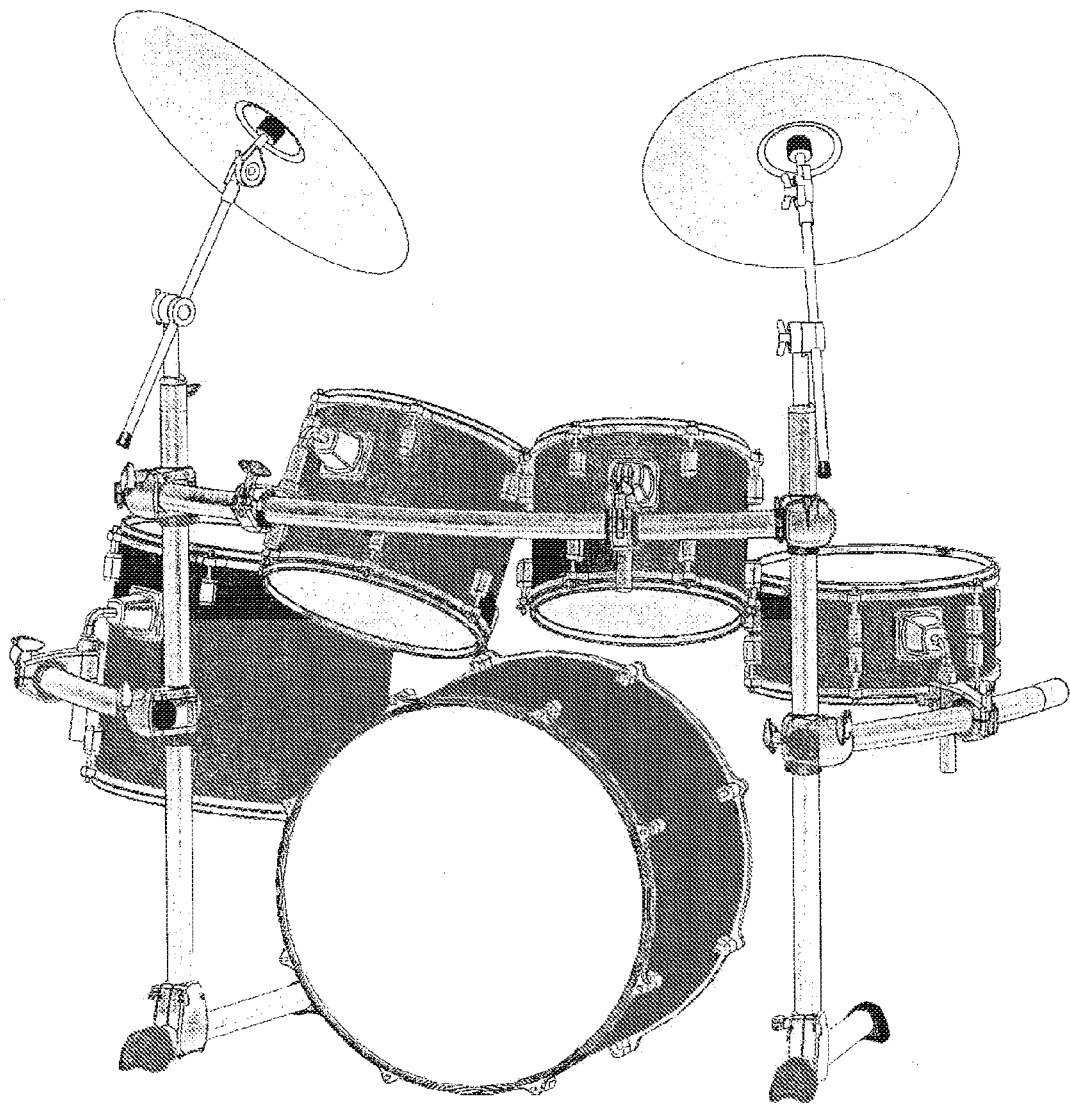
FIG. 22 shows a drum rack with several of the inventive clamps attached thereto.
Figure 23:
FIG. 23 shows a drum rack with an inventive clamp attached to a tier thereof.
Figure 24:
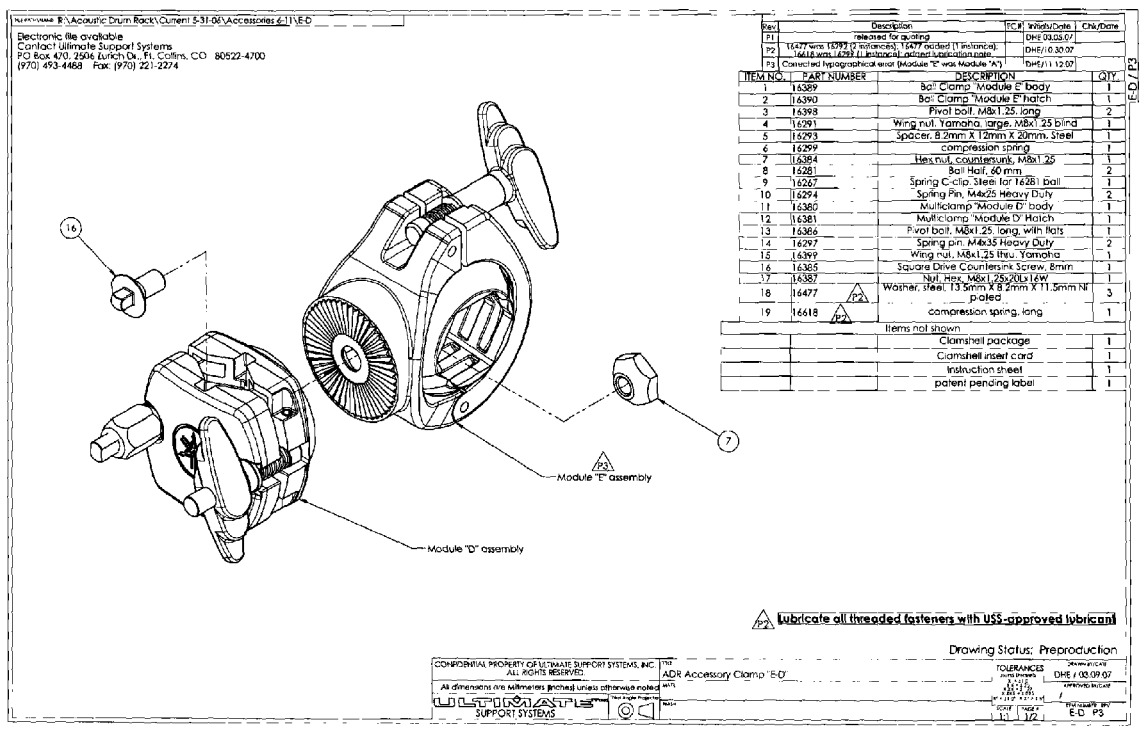
FIG. 24 shows an embodiment of that aspect of the inventive technology having a ball with a passageway therethrough, and having an attachable module in which an item support arm may be established.
Figure 25:
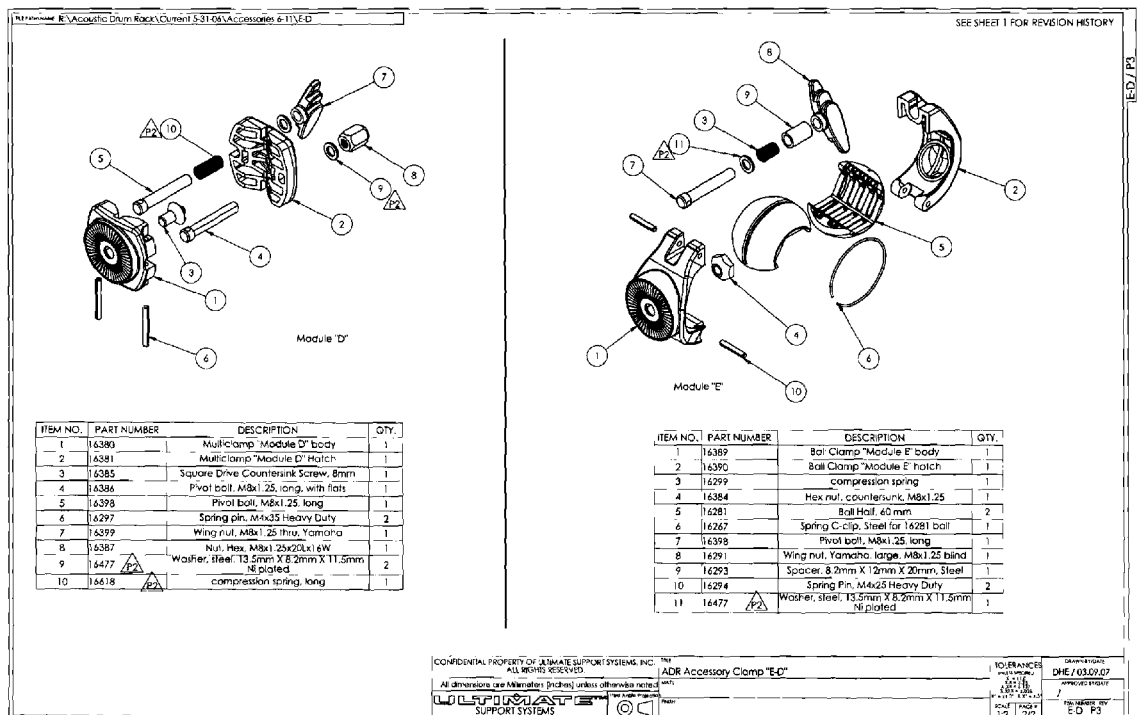
FIG. 25 shows an exploded view of an embodiment of that aspect of the inventive technology having a ball with a passageway therethrough, and having an attachable module in which an item support arm may be established.

Particular "solid ball" embodiments (e.g., as shown in FIG. 14) may include an item support rack member force enhancer that is different from an item support rack member retention force enhancer. As such, an adjustable support apparatus may comprise: a ball 20, a housing established at least partially about the ball and that itself includes: ball compression surfaces 21 adapted to apply a ball retention force to the ball; and item support rack member compression surfaces 22 adapted to apply an item support rack member retention force to an item support rack member; an item support rack member force enhancer 24 adapted to enhance an item support rack member retention force; and an item support rack member retention force enhancer that is different from the ball retention force enhancer and that is adapted to apply a retention force primarily to the item support rack member; where the ball is not configured for establishment directly onto the item support rack member. Further, the housing may be adapted to be side-assemblable onto the item support rack member (and possibly also onto the ball), and the ball retention force enhancer may be pivotally established relative to the housing.

Both the "pierced ball" and the "solid ball" type apparatus may share similar features. The following are a few of the many features that may be found in each type: the housing may comprise the item support arm compression surfaces; the item support arm compression surfaces may be part of a separate module that is securable to and positionally adjustable relative to the housing (see FIGS. 24 and 25); the item support arm may be extendable along an item support arm axis during item support arm release configuration, the item support arm may be rotatable about an item support arm axis during item support arm release configuration, the ball retention force enhancer (or, in certain embodiments, the single force enhancer) may pivotally established relative to the housing; the ball retention force enhancer (or, in certain embodiments, the single retention force enhancer) may comprise a shaft and a bias element established about the shaft so as to facilitate a threshold snapping of the shaft into a position from which the item support rack member retention force can be enhanced; the ball retention force enhancer (or, in certain embodiments, the single retention force enhancer) may include threaddedly engageable surfaces; the item support arm retention force enhancer (or, in certain embodiments, the single retention force enhancer) may includes threaddedly engageable surfaces; the housing may comprise a spatial shaft into which at least part of the ball retention force enhancer (or, in certain embodiments, the single retention force enhancer) may settle; the spatial shaft may comprise at least one ridge configured so as to enable a threshold snapping of the ball retention force enhancer into a position from which a retention force can be enhanced; the apparatus may further comprise a bias element (e.g., a coiled spring) established (e.g., about at least part of the ball retention force enhancer) so as to facilitate operation of the ball retention force enhancer (or, in certain embodiments, the single retention force enhancer); and any of the force retention enhancers (e.g., the ball retention force enhancer) may include threaddedly engageable surfaces. It is further of note that the term "ball"—whether used in reference to the ball that is found in "pierced ball" or "solid ball" embodiments—is broad. As such, a ball need not be perfectly spherical, nor perfectly smooth, nor be rollable in all directions. Indeed, in "pierced ball" embodiments, the passageway established through the ball renders the ball flat on two opposing sides (due to dome shaped slices of the ball that have been removed); nonetheless, such specific device is still considered a ball. It is also of note that were an apparatus is said to be side-assemblable (without further specificity), such indicates merely that is may be side-assemblable onto a item support rack member.

Also, in either the "pierced ball" or "solid ball" embodiments, any of the retention force enhancers may include a shaft that may be pivotally established. Ridge(s) 50 may be established as part of the spatial shaft into which the retention force enhancer (e.g., a bolt) may settle; such ridge(s) may be established so as to enable a threshold snapping of the retention force enhancer into a position from which a retention force can be enhanced. A bias element 16 (e.g., a coiled spring) may be established (e.g., about the shaft) so as to facilitate operation of the retention force enhancer. For example, it may keep a washer or collar 76 in operational position to allow for force enhancement; it may facilitate disapplication of an enhanced force.

It is of note that a variety of uses and applications is contemplated for the inventive technology. Primary among them is the use of the apparatus in a musical instrument rack such as a drum rack, a structure designed to secure percussion instruments in that spatial orientation suitable and/or desired by a percussionist. Indeed, several of the apparatus may find use in a single drum rack to hold various drums and cymbals in their respective positions as desired.

It is of note that one of ordinary skill in the relevant art would, upon reviewing the specification, including the figures, be able to use well known manufacturing techniques in order to make the apparatus. Use would be readily apparent to anyone even vaguely familiar with clamps that are used in drum racks.

As can be easily understood from the foregoing, the basic concepts of the present invention may be embodied in a variety of ways. It involves both support techniques as well as devices to accomplish the appropriate support. In this application, the support techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this patent application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "clamp" should be understood to encompass disclosure of the act of "clamping"—whether explicitly discussed or not— and, conversely, were there effectively disclosure of the act of "clamping", such a disclosure should be understood to encompass disclosure of a "clamp" and even a "means for clamping" Such changes and alternative terms are to be understood to be explicitly included in the description.

Any acts of law, statutes, regulations, or rules mentioned in this application for patent; or patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Patent Application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the support devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. An adjustable support apparatus comprising:
   a ball having a passage therethrough,
   an item support rack member having a longitudinal axis and established through said passage;
   a housing that itself comprises ball compression surfaces adapted to apply a ball retention force to said ball, wherein said ball retention force, when applied to said ball, immobilizes said ball relative to said housing;
   wherein disapplication of said ball retention force causes said apparatus to be in a rack member release configuration, and when said apparatus is in said rack member release configuration said ball may be slidably moved relative to said item support rack member, along said longitudinal axis;
   item support arm compression surfaces adapted to apply an item support arm retention force to an item support arm;

a ball retention force enhancer adapted to enhance said ball retention force without enhancing said item support arm retention force; and an item support arm retention force enhancer adapted to enhance said item support arm retention force without enhancing said ball retention force, wherein said ball is adapted to be side-assemblable onto said item support rack member, wherein said housing moves through space during said longitudinal axial motion of said ball relative to said item support rack member when said apparatus is simultaneously in:

said rack member release configuration, and a item support arm lock configuration.

2. An adjustable support apparatus as described in claim 1 wherein said housing comprises said item support arm compression surfaces.

3. An adjustable support apparatus as described in claim 1 wherein said item support arm compression surfaces are part of a separate module that is securable to and positionally adjustable relative to said housing.

4. An adjustable support apparatus as described in claim 1 wherein said item support arm is extendable along an item support arm axis during said item support release configuration.

5. An adjustable support apparatus as described in claim 1 wherein said item support arm is rotatable about an item support arm axis during said item support release configuration.

6. An adjustable support apparatus as described in claim 1 wherein said ball retention force enhancer is pivotally established relative to said housing.

7. An adjustable support apparatus as described in claim 1 wherein said housing comprises a spatial shaft into which at least part of said ball retention force enhancer may settle.

8. An adjustable support apparatus as described in claim 7 wherein said spatial shaft comprises at least one ridge configured so as to enable a threshold snapping of the ball retention force enhancer into a position from which a ball retention force can be enhanced.

9. An adjustable support apparatus as described in claim 1 wherein said ball is adapted to snap onto the item support rack member upon application of a threshold force.

10. An adjustable support apparatus as described in claim 1 wherein said ball is openable along a ball hinge so as to allow establishment of the ball onto the item support rack member without requiring it be slid over an end of the item support rack member.

11. An adjustable support apparatus as described in claim 1 wherein said inner surfaces of said ball conform to outer surfaces of said item support rack member.

12. An adjustable support apparatus as described in claim 1 further comprising a bias clip adapted to keep the ball on the item support rack member when the housing is removed from the item support rack member.

13. An adjustable support apparatus as described in claim 1 wherein ball is separable from the rack member and the housing.

14. An adjustable support apparatus as described in claim 1 wherein said ball retention force enhancer and said item support arm retention force enhancer are distinct and different parts.

15. An adjustable support apparatus as described in claim 1 wherein said adjustable support apparatus is a percussion instrument support apparatus.

16. An adjustable support apparatus as described in claim 1 wherein said apparatus allows rotational movement of the housing relative to the ball without necessarily also simultaneously allowing motion of the housing relative to the rack member.

17. An adjustable support apparatus as described in claim 1 wherein said ball retention force enhancer applies said ball retention force in a direction that is orthogonal to that direction in which said item support arm retention force enhancer applies said item support arm retention force.

18. An adjustable support apparatus as described in claim 1 wherein said housing further comprises a hinge.

19. An adjustable support apparatus comprising:

a ball having a passage therethrough, a housing that itself comprises ball compression surfaces adapted to apply a ball retention force to the outer surface of said ball;

wherein, when said apparatus is in a rack member release configuration, said ball and said housing move together, through space, along a longitudinal axis of an item support rack member established through said passage and by equal lengths along said longitudinal axis, said apparatus further comprising:

item support arm compression surfaces adapted to apply an item support arm retention force to an item support arm;

item support rack member compression surfaces of said ball adapted to apply an item support rack member retention force to said item support rack member;

a ball retention force enhancer adapted to simultaneously enhance said ball retention force and said item support rack member retention force without enhancing said item support arm retention force; and an item support arm retention force enhancer adapted to enhance said item support arm retention force without enhancing said ball retention force, wherein said ball is adapted to be side-assemblable onto said item support rack member.

20. An adjustable support apparatus as described in claim 19 wherein said item support arm retention force enhancer enhances said item support arm retention force without enhancing said ball retention force.

21. An adjustable support apparatus as described in claim 19 wherein said ball retention force enhancer is pivotally established relative to said housing.

22. An adjustable support apparatus that comprises:

a ball;

an item support arm extending from said ball;

a housing established at least partially around the ball and that itself comprises:

ball compression surfaces adapted to apply a ball retention force to the ball; and item support rack member compression surfaces adapted to apply an item support rack member retention force to an item support rack member;

a single retention force enhancer adapted to enhance said item support rack member retention force and said ball retention force;

wherein said housing is adapted to be side-assemblable onto said item support rack member and onto said ball, wherein, during adjustment of said adjustable support apparatus, and when said apparatus is in an item support rack member release configuration and an item support arm release configuration, said item support arm is movable, said ball is movable along a longitudinal axis defined by said item support rack member, and said item support rack member is immovable.

23. An adjustable support apparatus as described in claim 19 wherein said housing further comprises a hinge.

24. An adjustable support apparatus as described in claim 22 wherein a portion of said item support rack member is established within said housing and has a item support rack member portion center, said ball has a ball center, and a line between said item support rack member portion center and said ball center defines an axis, and wherein said single retention force enhancer applies a force in a direction that is parallel said axis.

25. An adjustable support apparatus as described in claim 22 wherein said single force enhancer comprises threadedly engageable surfaces.

26. An adjustable support apparatus as described in claim 22 wherein said housing comprises a spatial shaft into which at least part of said single retention force enhancer may settle.

27. An adjustable support apparatus as described in claim 22 further comprising a bias element established so as to facilitate operation of the single retention force enhancer.

28. An adjustable support apparatus as described in claim 22 wherein said ball is adapted to snap onto the item support rack member upon application of a threshold force.

29. An adjustable support apparatus as described in claim 22 wherein said housing further comprises a hinge.

30. An adjustable support apparatus as described in claim 22 wherein said single retention force enhancer comprises a shaft that defines a longitudinal axis and said single retention force enhancer is pivotable about a pivot axis that is orthogonal to said longitudinal axis.

31. An adjustable support apparatus as described in claim 30 wherein said single retention force enhancer further comprises a bias element established about the shaft so as to facilitate a threshold snapping of the shaft into a position from which the item support rack member retention force and the ball retention force can be enhanced through use of said single retention force enhancer.

* * * * *